United States Patent
Gindele et al.

(10) Patent No.: US 6,956,967 B2
(45) Date of Patent: Oct. 18, 2005

(54) COLOR TRANSFORMATION FOR PROCESSING DIGITAL IMAGES

(75) Inventors: Edward B. Gindele, Rochester, NY (US); Michael S. Axman, Rochester, NY (US); John D. Buhr, Newton, PA (US); Michael W. Dupin, Rochester, NY (US); Raymond W. Ptucha, Honeoye Falls, NY (US); David K. Rhoda, Rochester, NY (US); John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 660 days.

(21) Appl. No.: 10/151,622

(22) Filed: May 20, 2002

(65) Prior Publication Data

US 2003/0215133 A1 Nov. 20, 2003

(51) Int. Cl.[7] .................................................. G06K 9/00
(52) U.S. Cl. ...................................... 382/167; 358/518
(58) Field of Search .................................. 382/162, 167, 382/274; 358/518, 520

(56) References Cited

U.S. PATENT DOCUMENTS

| | | |
|---|---|---|
| 4,159,174 A | 6/1979 | Rising |
| 4,279,502 A | 7/1981 | Thurm et al. |
| 4,962,403 A | 10/1990 | Goodwin et al. |
| 5,134,573 A | 7/1992 | Goodwin |
| 5,229,810 A | 7/1993 | Cloutier et al. |
| 5,959,720 A | 9/1999 | Kwon et al. |
| 6,130,756 A | * 10/2000 | Grady et al. ................. 358/1.1 |
| 6,133,983 A | 10/2000 | Wheeler |
| 6,160,634 A | 12/2000 | Terashita |
| 6,243,133 B1 | * 6/2001 | Spaulding et al. .......... 358/516 |

FOREIGN PATENT DOCUMENTS

| | | |
|---|---|---|
| EP | 0 773 470 | 5/1997 |
| EP | 0 793 138 | 9/1997 |
| EP | 0 957 629 | 11/1999 |
| EP | 0 961 483 | 12/1999 |

OTHER PUBLICATIONS

Applied Regression Analysis Third Edition, John Wiley & Sons, Inc., 1966.

* cited by examiner

*Primary Examiner*—Phuoc Tran
(74) *Attorney, Agent, or Firm*—Raymond L. Owens

(57) ABSTRACT

A method of transforming the color appearance of a plurality of digital images includes receiving a plurality of digital images from a capture medium wherein each digital image includes a plurality of pixel values relating to at least three basic colors; calculating a color correction transform by using a non-linear adjustment that is independent of the digital images and which corrects an under-exposure condition as a function of the capture medium; and a linear functional relationship dependent upon the pixels of the basic colors, the linear functional relationship defining an exposure-level-dependent estimate of gray corresponding to the photographic response of the capture medium; and using the color correction transform to modify the pixels of the plurality of digital images wherein the pixels within a digital image are transformed with varying degrees of color modification as a function of exposure.

32 Claims, 14 Drawing Sheets

COLOR TRANSFORMATION FOR PROCESSING DIGITAL IMAGES

FIELD OF INVENTION

The present invention relates to providing color transformed digital images with improved color appearance.

BACKGROUND OF THE INVENTION

Imaging systems designed to produce digital images from a capture medium such as a photographic film strip can encounter problems with color reproduction due to a variety of causes. If the spectral sensitivities of the film scanner hardware are not well matched to the spectral transmittances of the dye materials used in common film products, the digital pixel values representing a color neutral object, i.e. a spectrally neutral reflective photographed object, will shift in color in a manner that is linearly related to the scene exposure. Other causes of exposure related color reproduction problems include film material contrast mismatches between different color sensing layers and chemical process sensitivity of the film material.

In U.S. Pat. No. 4,279,502, Thurm et al. discloses a method for optical printing devices that includes determining color balanced copying light amounts from photometric data derived directly from the film without the use of film type specific parameter values. In this method, first and second color density difference functional correlation values are established from density values denoting the results of measurements at a plurality of regions of the photographic film strip which includes the original image being copied. These correlation values are then used for determining the copying light amounts for most of the originals on the photographic film strip. The light amounts for originals containing illuminant error or color dominant subjects are selected differently using empirically determined threshold values. To be effective, this method requires the establishment of two different, independent functional relationships that cannot capture the correct correlation among three primary color densities in the original image.

In U.S. Pat. No. 5,959,720 Kwon et al. describe a similar method for optical printing devices that establishes a linear relationship between film exposure and the gray center color. The method disclosed by Kwon et al. includes the steps of individually photoelectrically measuring the density values of the original film material in at least three basic colors at a plurality of regions of the original film material; and establishing a single, multidimensional functional relationship among the at least three basic colors representing an exposure-level-dependent estimate of gray for use as values specific to said length of the original material for influencing the light amount control in the color copying operation.

Both methods disclosed by Thurm et al. and Kwon et al. include deriving digital images from a film material, analyzing the digital images to establish an exposure dependent color balance relationship, and using the exposure dependent color balance relationship to improve the color appearance of photographic prints made by altering the amount of projected light through the film material onto a photographic paper receiver.

The technology described by Kwon et al. is also used to improve the color appearance of photographic prints made in digital imaging systems. In these applications, the pixel values of the digital images derived by scanning the film material are modified for color balance. That is, a triplet of color pixel values representing the gray center of each digital image is calculated using the established multidimensional functional relationship. The triplet of color pixel values is subtracted from all the pixels of the digital image thus changing the overall color balance of the processed digital image. In addition, the multidimensional functional relationship can be used to modify the color appearance of pixels of the digital images on a pixel-by-pixel basis. However, there are still problems associated with Kwon et al.'s technique that relate to the non-linear photo response of the capture medium, in particular to pixels relating to under-exposed regions of the photographic film strip.

In U.S. Pat. No. 5,134,573, Goodwin discloses a method for adjusting the contrast of digital images derived from digitally scanned photographic film materials. The method improves the overall image contrast through the application of a sensitometric correction function in the form of a look-up-table (LUT) designed to linearize the photographic response of photographic film products. While the application of sensitometric correction function does improve the color contrast of the digital image pixel values corresponding to under-exposed regions of photographic film materials, it does not account for the exposure dependent color problems associated with regions of film materials that were exposed with proper amounts of light. Furthermore, Goodwin's method does not account for changes in the film sensitometry induced by chemical processing errors.

SUMMARY OF THE INVENTION

It is an object of the present invention to provide a method of transforming the color appearance of a plurality of digital images that corrects for the under-exposure problems associated with the photographic response of the capture medium.

This object achieved by a method of transforming the color appearance of a plurality of digital images including the steps of:

a) receiving a plurality of digital images from a capture medium wherein each digital image includes a plurality of pixel values relating to at least three basic colors;

b) calculating a color correction transform by using:

i) a non-linear adjustment that is independent of the digital images and which corrects an under-exposure condition as a function of the capture medium; and ii) a linear functional relationship dependent upon the pixels of the basic colors, the linear functional relationship defining an exposure-level-dependent estimate of gray corresponding to the photographic response of the capture medium; and c) using the color correction transform to modify the pixels of the plurality of digital images wherein the pixels within a digital image are transformed with varying degrees of color modification as a function of exposure.

ADVANTAGES

The present invention corrects for the non-linear photo response characteristics associated with the digital image capture medium and corrects for contrast and color problems associated with under-exposure pixels and color problems associated with properly exposed digital images. The present invention makes use of color pixel information from a plurality of digital images on the same capture medium to develop a color correction transform. It has been recognized that in an under-exposure situation, it is the capture medium that is a source of problems.

DETAILED DESCRIPTION OF THE INVENTION

Figure 1:
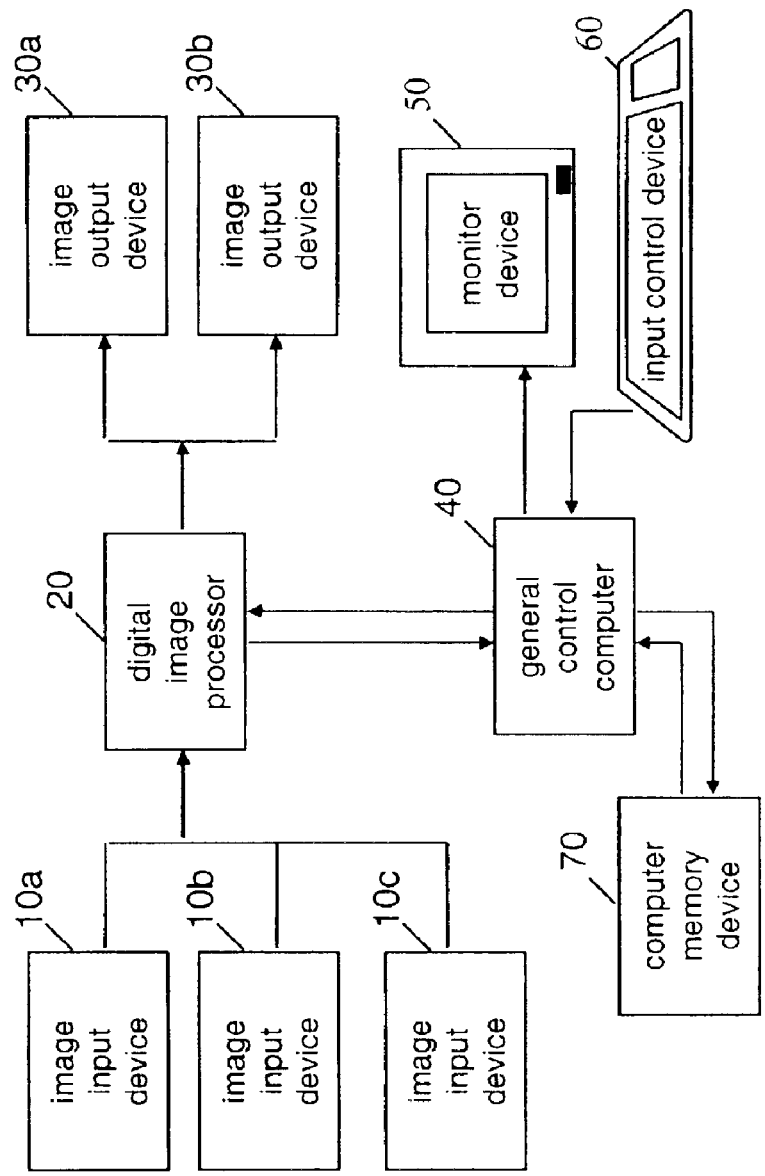
FIG. 1 is a block diagram of digital photofinishing system suitable for practicing the present invention.

The present invention provides a method of transforming the color appearance of a plurality of digital images. An important feature of the present invention relates to calculating a color correction transform. As will be disclosed in detail later, the color correction transform includes at least two components: a non-linear adjustment that is independent of the digital images and which corrects an under-exposure condition as a function of the capture medium; and a linear functional relationship dependent upon the pixels of the basic colors, the linear functional relationship defining an exposure-level-dependent estimate of gray corresponding to the photographic response of the capture medium. By using this color correction transform, the appearance of digital images captured on the same medium can be significantly improved.

In the following description, a preferred embodiment of the present invention will be described as a software program. Those skilled in the art will readily recognize that the equivalent of such software can also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein, can be selected from such systems, algorithms, components and elements thereof known in the art. Given the description as set forth in the following specification, all software implementation thereof as a computer program is conventional and within the ordinary skill in such arts.

Still further, as used herein, the computer program can be stored in a computer readable storage medium, which can comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is comprised of one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels but can include more color channels. Other configurations are also practiced, e.g. cyan, magenta, and yellow digital image channels. Motion imaging applications can be thought of as a time sequence of digital images. Although the present invention describes a digital image channel as a two dimensional array of pixels values arranged by rows and columns, those skilled in the art will recognize that the present invention can be applied to mosaic (nonrectilinear) arrays with equal effect.

The present invention can be implemented in computer hardware. Referring to FIG. 1, the following description relates to a digital imaging system which includes image input devices 10a, 10b, and 10c, an digital image processor 20, image output devices 30a and 30b, and a general control computer 40. The system can include a monitor device 50 such as a computer console or paper printer. The system can also include an input control device 60 for an operator such as a keyboard and or mouse pointer. Still further, as used herein, the present invention can be implemented as a computer program and can be stored in a computer memory device 70, i.e. a computer readable storage medium, which can comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well known computer system, such as a personal computer.

Multiple capture devices 10a, 10b, and 10c are shown illustrating that the present invention can be used for digital images derived from a variety of imaging devices. For example, FIG. 1 can represent a digital photofinishing system where the image input device 10a can be a film scanner device which produces digital images by scanning conventional photographic images, e.g. color negative film or slide film transparencies. Similarly image input device 10b can be a digital camera. The digital image processor 20 provides the means for processing the digital images to produce pleasing looking images on an intended output device or media. Multiple image output devices 30a and 30b are shown illustrating that the present invention can be used in conjunction with a variety of output devices which can include a digital color printer and soft copy display.

Figure 2:
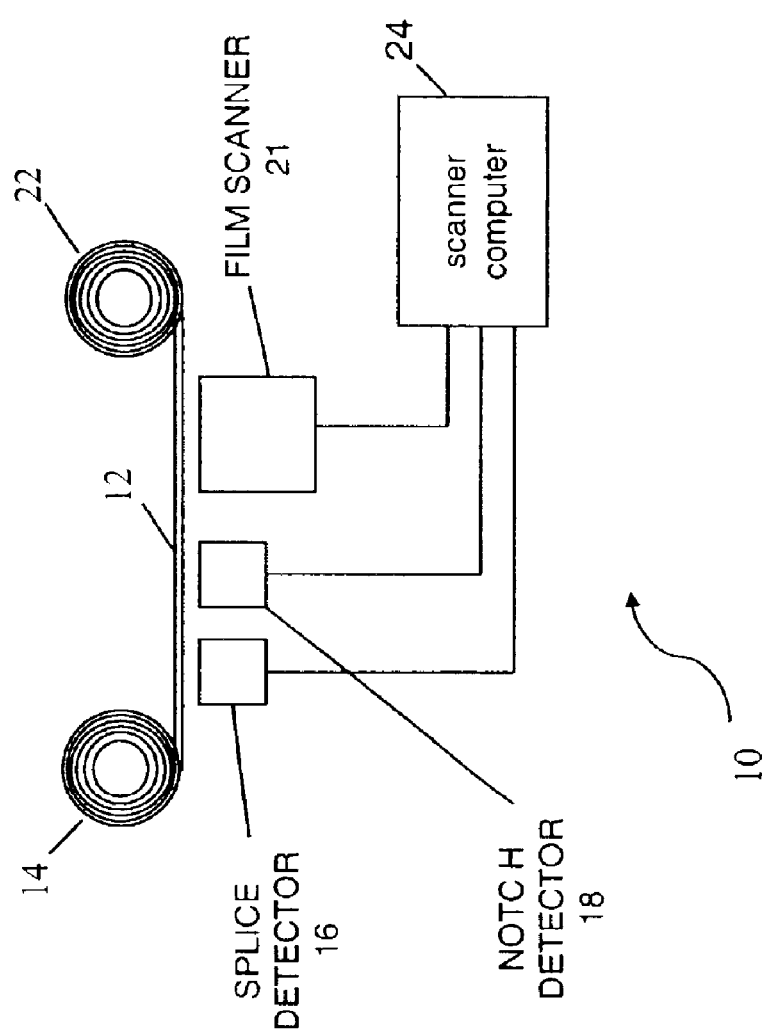
FIG. 2 is a block diagram of a film scanner and for performing the color transform method of the invention.
Figure 3:
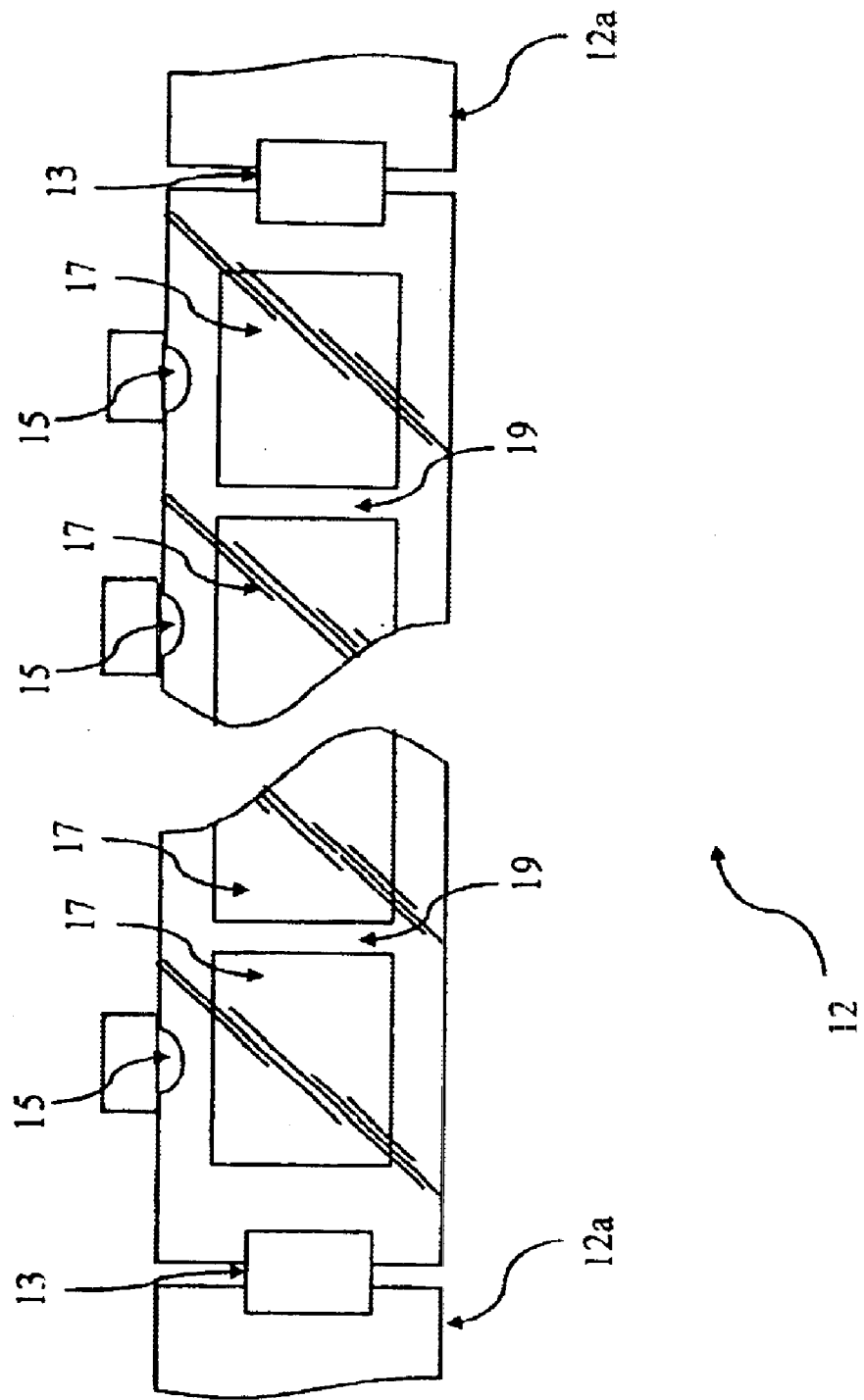
FIG. 3 is a plan view of portions of photographic film strips showing splicing of successive photographic film strip orders.

Referring to FIGS. 2 and 3, reference numeral 10 denotes an input capture device in the form of a scanner apparatus that produces digital images from a photographic film capture medium. In input capture device 10, a length of film 12 comprised of a series of separate photographic film strips 12a spliced together by means of adhesive connectors 13 is fed from a supply reel 14 past a splice detector 16, a notch detector 18, and a film scanner 21 to a take-up reel 22. Splice detector 16 serves to generate output signals that identify the beginning and end of each separate film order which is made up of a series of original image frames 17 on a single continuous photographic film strip 12a. Notch detector 18 senses notches 15 formed in the photographic film strip adjacent to each original image frame and provides output signals that are used to correlate information generated in the film scanner with specific original image frames. The scanner computer 24 coordinates and controls the components of the film scanner 21. Film scanner 21 scans, i.e. photometrically measures in known manner, the density values of at least three primary colors in a plurality of regions on the photographic film strip 12a including the original image frames 17 as well as the inter-frame gaps 19. The photometric measurements corresponding to a given original image frame constitute a source digital image. The term regions as used herein can be taken to mean individual image pixels or groups of pixels within a digital image or pixels corresponding to the photometric measurements of the inter-frame gaps, i.e. the regions of unexposed film between image frames. The digital images corresponding to the original image frames and the signals from detectors 16, 18, and film scanner 21 corresponding to the inter-frame gaps 19 are fed to a digital image processor 20 which calculates a color correction transform. The digital image processor 20 applies the color correction transform to the source digital images and transmits the processed digital images to digital output device 30 in the form of a digital color printer. Digital output device 30 operates to produce a hard copy photographic print from the processed digital images. Alternatively, the processed digital images can be stored and retrieved for viewing on an electronic device or on a different digital output device.

Figure 4:
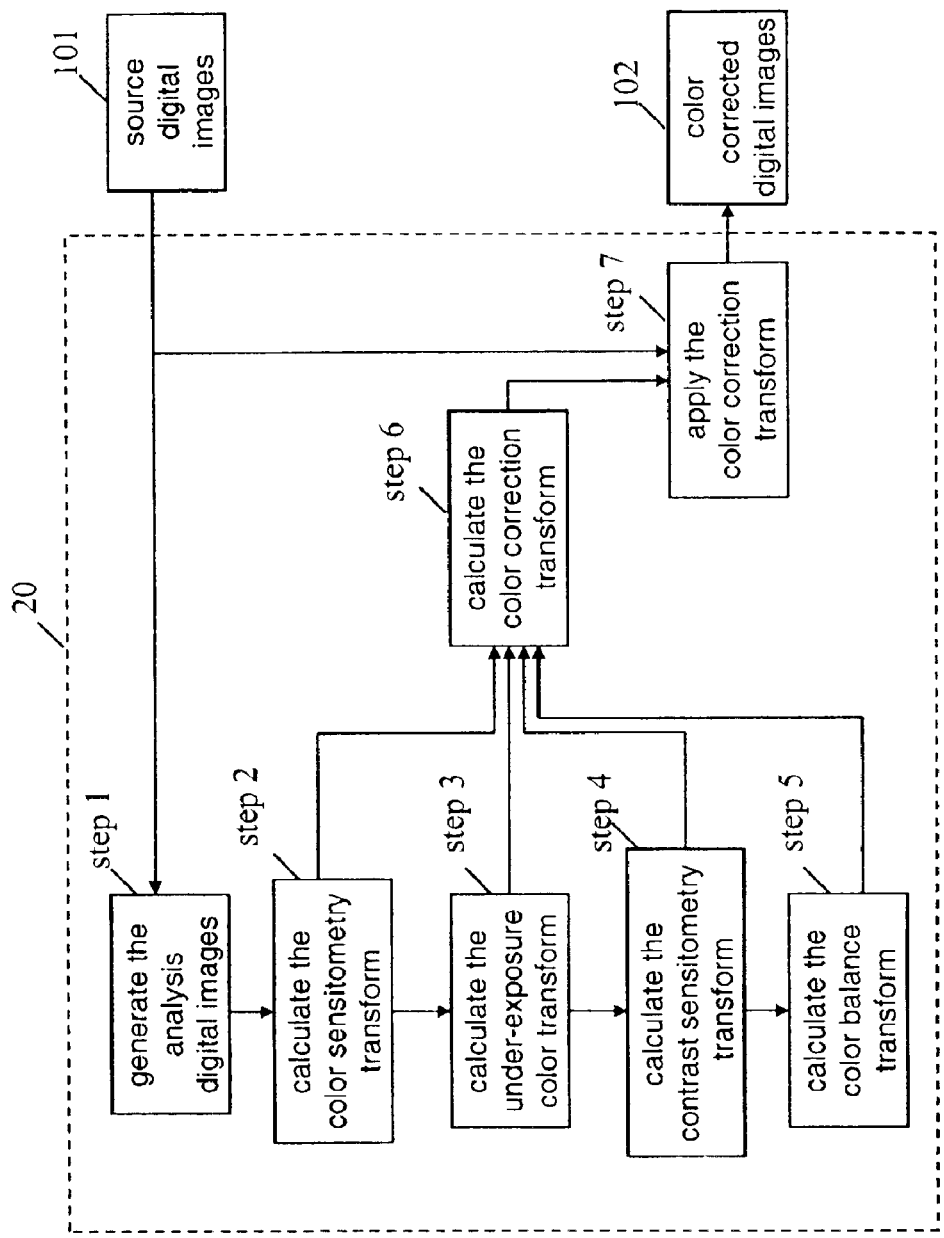
FIG. 4 is a block diagram showing the details of the digital image processor.
Figure 9:
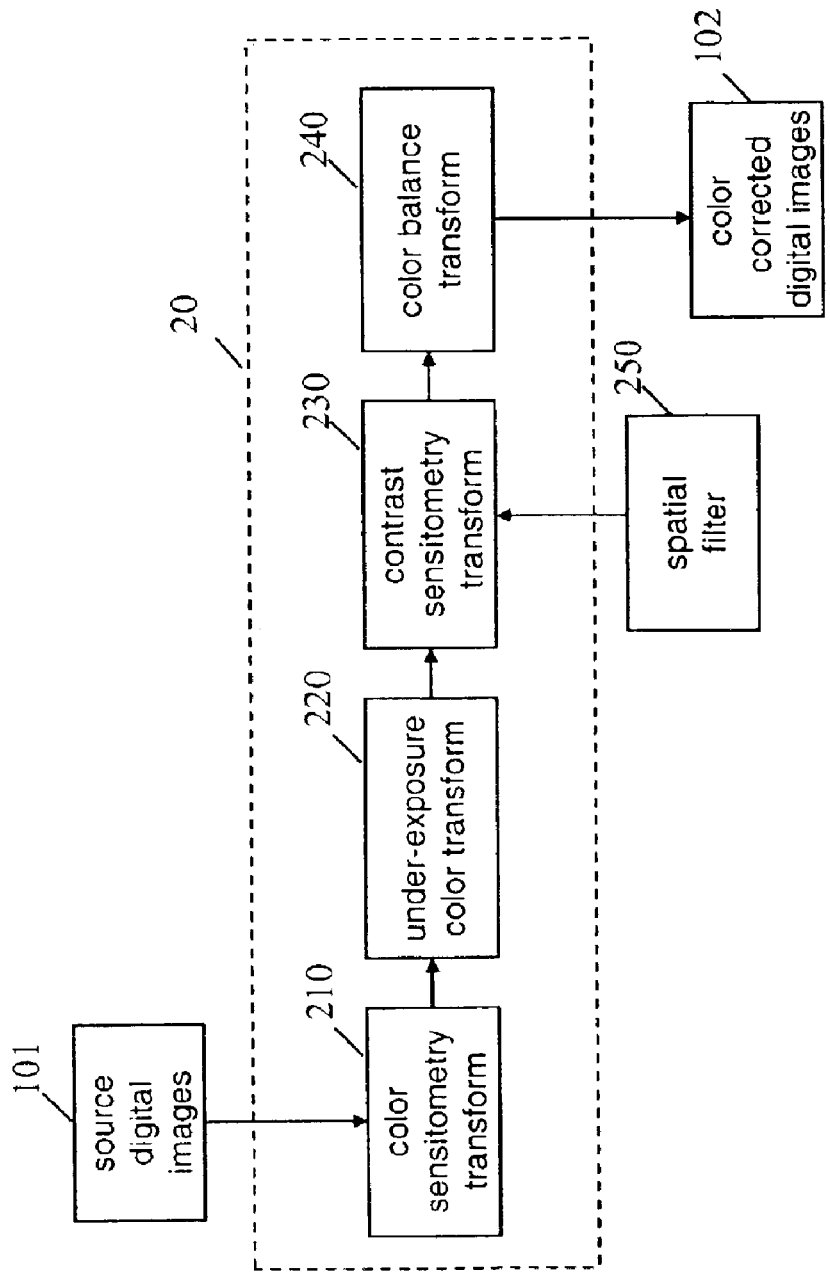
FIG. 9 is a functional block diagram of the component transforms that are included in the color correction transform.

The procedural details of the digital image processor 20 shown in FIG. 1 are illustrated in more detail in FIG. 4 and shown in functional block diagram form in FIG. 9. The color correction transform calculated by the digital image processor 20 and applied to the set of source digital images 101 (received by film scanner 10 shown in FIG. 2) is accomplished in more than one step. In step 1, a set of analysis digital images is generated from the set of source digital images 101. The analysis digital images are used to calculate four separate transforms in steps 2 through 5 and are combined into one color correction transform in step 6. The color correction transform is then applied to the source digital images 101 in step 7 resulting in a set of processed digital images referred to as the color corrected digital images 102.

The source digital images 101 produced with film scanner 21 are of high spatial resolution, i.e. digital images that contain a large number of pixels, typically on the order of more that a million, as required to produce sufficiently detailed images when printed. In general, the calculation of analysis variables does not require such high resolution images to provide robust results. In step 1, the set of analysis digital images are generated as lower spatial resolution versions of the source digital images 101, typically containing approximately one thousand pixels each.

Figure 5:
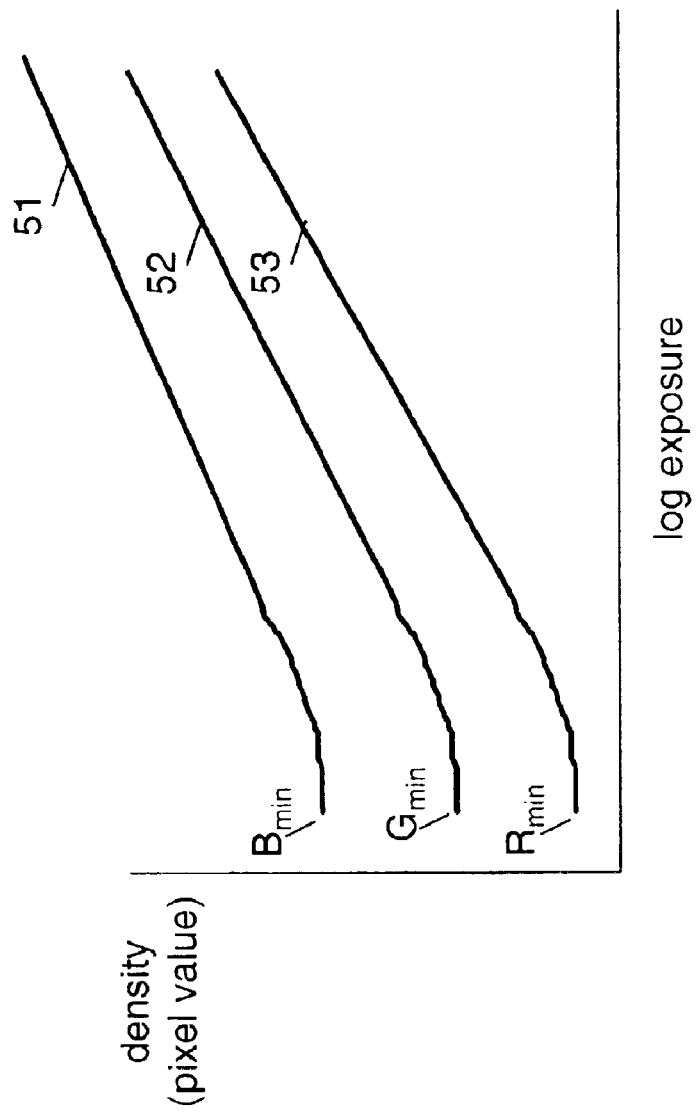
FIG. 5 is a graph showing the photo response of typical photographic film product.
Figure 6:
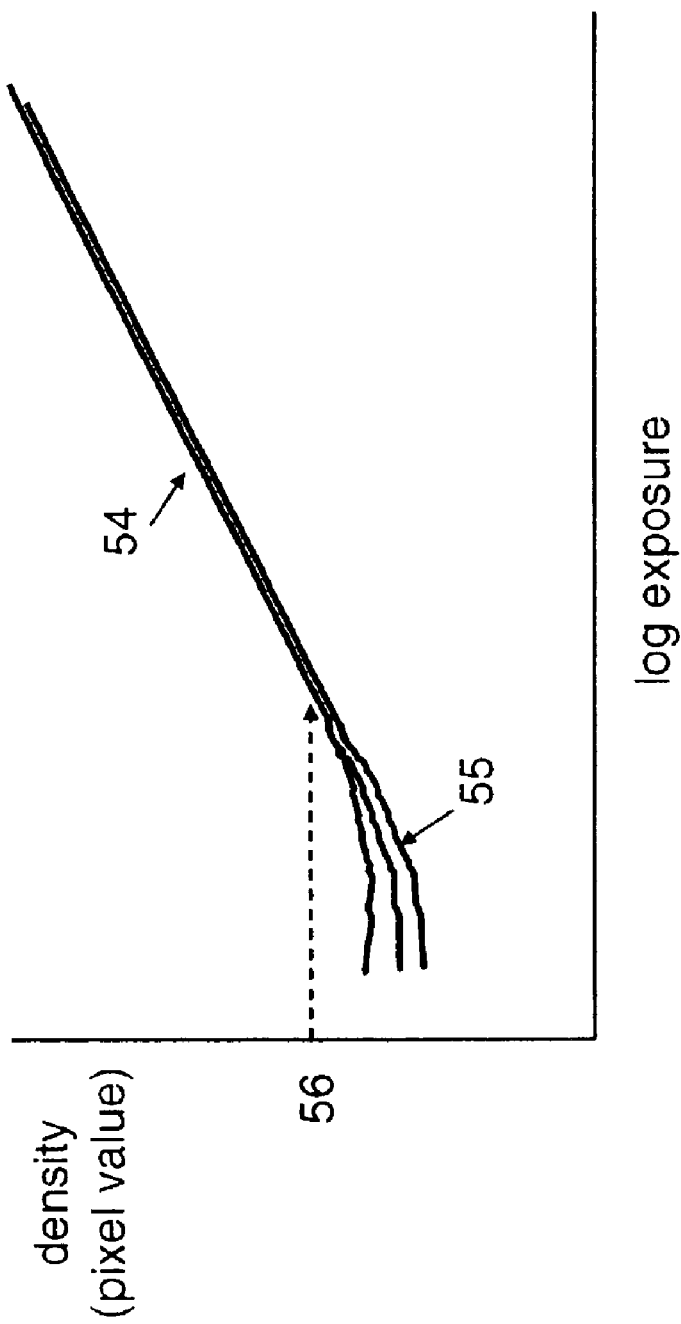
FIG. 6 is a graph showing the photo response of typical photographic film product after having the color sensitometry transform applied.

Step 2 includes the calculation of a color sensitometry transform 210 (shown in FIG. 9) designed to correct for intensity dependent (exposure dependent) color sensitometry problems inherent in and common to the set source digital images. Exposure dependent color sensitometry problems manifest as a complicated color cast imparted to the source digital images 101. There are many physical and chemical factors that can contribute to color sensitometry problems. However, spectral inaccuracies in the manufacturing process of the photosensitive materials, aberrant chemical processes used to develop the photographic film strips 12a, and spectral inaccuracies in the film scanner are three of the main causes. FIG. 5 illustrates the shape of the photographic response curve of a typical photographic film product. The color sensitometry transform 210 is designed to remove slope differences among the individual red, green, and blue response curves depicted in FIG. 5 as the red 51, green 52, and blue 53 response curves. The effective photographic response curves resulting from the application of the color sensitometry transform 210 for the film product depicted in FIG. 5 is shown in FIG. 6. Notice that color sensitometry transform 210 has the effect of removing both the absolute density differences between the red 51, green 52, and blue 53 response curves shown in FIG. 5 and the slope differences. The photographic response domain indicated by 54 corresponds to regions of the photographic film that received a sufficient exposure. The response domain indicated by 55 corresponds to a region of the photographic film that received too little light. This response domain is referred to as the under-exposure domain. In general the under-exposure domain still has absolute density differences and slope differences remaining that are not removed with the application of the color sensitometry transform 210.

Figure 7:
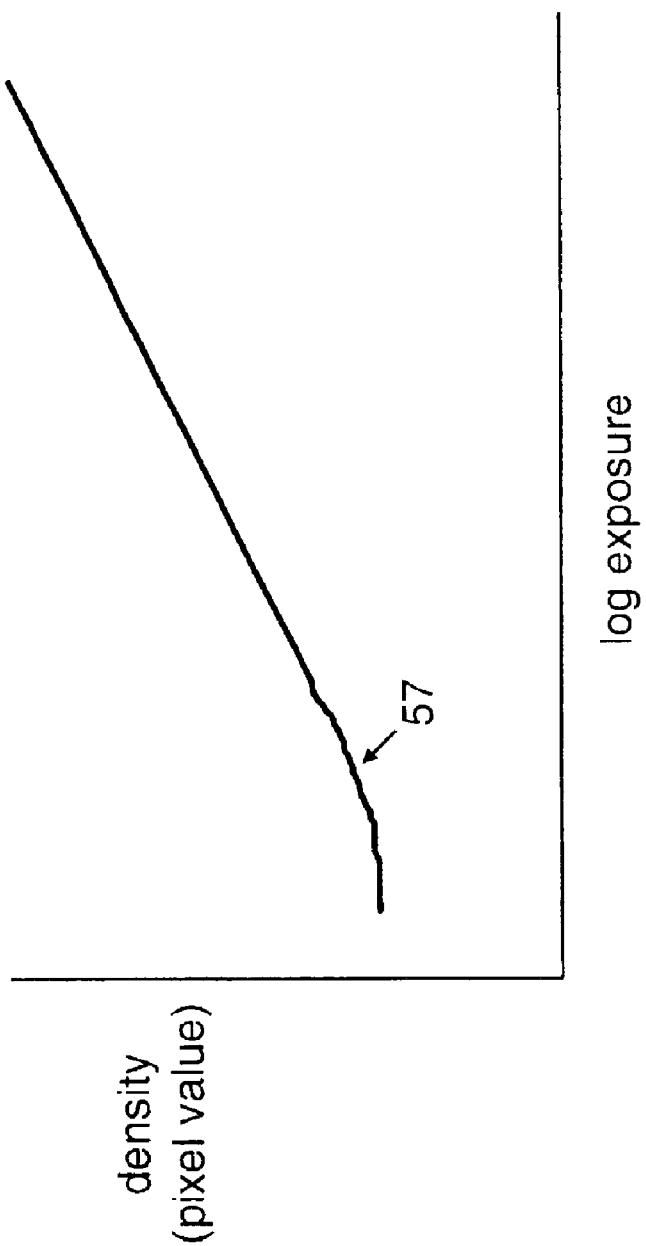
FIG. 7 is a graph showing the photo response of typical photographic film product after having the under-exposure color transform applied.

Step 3 shown in FIG. 4 includes the calculation of an under-exposure color transform 220 (shown in FIG. 9) designed to improve the consistency between the red, green, and blue photographic response curve shapes depicted in FIG. 6. FIG. 7 illustrates the combined effect of the color sensitometry transform 210 and the under-exposure color transform 220. As depicted in FIG. 7, the density differences between the red, green, and blue response curves have been removed. However, the under-exposure domain indicated by 57 still has a non-linear shape.

Step 4 shown in FIG. 4 includes the calculation of a contrast sensitometry transform 230 designed to linearize the photographic response curves. When combined with the color sensitometry transform 210 and the under-exposure color transform 220, the application of the contrast sensitometry transform 230 results in the photographic response curves depicted in FIG. 8. Notice that the under-exposure domain, indicated by numeral 58, now has a more linear photographic response shape with only a small level of mismatch in shape among the red, green, and blue response curves.

Each original image from which the set of source digital images 101 is derived can be affected by a unique scene illumination source. For example, images from the same photographic film strip 12a can be photographed with tungsten, daylight, overcast, etc. illumination sources. To compensate the source digital images for undesirable color casts imparted by the scene illumination source, and any residual sensitometry color problems left from the preceding transforms, the color correction transform includes the calculation of a color balance transform 240 designed to correct the overall color cast of the individual digital images as step 5 shown in FIG. 4.

Referring to FIG. 4, step 5 includes the calculation of the color balance transform 240 (shown in FIG. 9) which includes two parts: the calculation of a second color sensitometry transform designed to estimate any residual color casts in the image pixel data, and the calculation of a color balance position unique to each processed digital image. The results of the second color sensitometry transform are combined with the individual image color balance position to form the color balance transform 240.

The color correction transform calculated by the digital image processor 20 is therefore constructed from the four separate component transforms: the color sensitometry transform 210, followed by the under-exposure color transform 220, followed by the contrast sensitometry transform 230, followed by the color balance transform 240. Both the color sensitometry transform 210 and the color balance transform 240 are linear transforms. However, the contrast sensitometry transform 230 and the under-exposure color transform 220 are non-linear transforms. Therefore the color correction transform is a non-linear transform since at least one of its component transforms is non-linear.

It should also be noted that any one of the four above mentioned component transforms and any combination thereof are considered herein a color correction transform. For example, for some digital imaging systems, one or more of the four component transforms can be omitted and still yield a useful color correction transform. In addition, the order of application of the various component transforms can be changed and still yield a useful color correction transform. For example, a simpler implementation of the present invention has been found to be useful that includes constructing the color correction transform as: a color sensitometry transform 210, followed by a color balance transform 240, followed by a contrast sensitometry transform 230.

The color correction transform is applied to each source digital image 101 to produce a color corrected digital image 102 in step 7 shown in FIG. 4. The color correction transform is constructed by cascading the four component transforms into a single transform T[ ] using formula (1) in step 6

$$T[p_i] = T_4[T_3[T_2[T_1[p_i]]]] \quad (1)$$

where the $T_1[\ ]$ represents the color sensitometry transform 210, $T_2[\ ]$ represents the under-exposure color transform 220, $T_3[\ ]$ represents the contrast sensitometry transform 230, $T_4[\ ]$ represents the color balance transform 240, $p_i$ represents a pixel of a source digital image and $T[p_i]$ represents the processed pixel value. The color correction transform T[ ] can be implemented as three, one-dimensional look-up-tables (LUT). Since the component transforms $T_1[\ ]$, $T_2[\ ]$, and $T_3[\ ]$ are common to all the source digital images relating to a single photographic film strip 12a, they can be conveniently combined into a single LUT $T_5[\ ]$ as given by (2)

$$T_5[\ ] = T_3[T_2[T_1[\ ]]]. \quad (2)$$

The processed pixel value is then given by (3) as $$T[p_i] = T_4[T_5[p_i]] \quad (3)$$

It should also be noted that the color correction transform can be implemented by processing the entirety of the pixels of the source digital image successively with the component transforms. For example, transform $T_1[\ ]$ can be applied to the source digital image resulting in a modified digital image. Next the transform $T_2[\ ]$ can be applied to the modified digital image pixels to further modify the pixel values. This procedure of successively applying the component transforms, in general, requires more computer resources than the preferred method of combining the component transforms and then applying the combined transform to the image pixel data. However, the successive application method does have the advantage that the intermediate modified pixel values of the entire digital image are simultaneously available at each processing stage. FIG. 9 is a functional block diagram showing the succession of component transforms that are included in color correction transform.

In an alternative embodiment of the present invention, the image processing is performed by combining transforms $T_1[\ ]$ and $T_2[\ ]$ to form $T_6[\ ]$. The transform $T_6[\ ]$ is applied to a source digital image resulting in a modified digital image. The modified digital image is spatially filtered using an unsharp masking algorithm that forms a low-pass spatial component and a high-pass spatial component (depicted as spatial filter 250 in FIG. 9). The transform $T_3[\ ]$ is then applied to the low-pass spatial component and the high-pass spatial component is then added to the $T_3[\ ]$ transformed low-pass spatial component. The last transform applied is $T_4[\ ]$. Applying transform $T_3[\ ]$ directly to image pixel data raises the contrast of the processed digital images. This process also amplifies the magnitude of the noise present in the source digital image. By applying the transform $T_3[\ ]$ to the low-pass spatial component, the noise, which is largely of high spatial frequency character, is not amplified. The resulting color correction transform is more complicated to implement and requires more computational resources than the preferred embodiment, however, the processed images have less visible noise.

The color sensitometry transform 210 is designed to remove the effects of the exposure dependent color property of film products. The first step in calculating the color sensitometry transform 210 involves identifying pixels in the set of source digital images 101 that degrade the accuracy of the transform. A plurality of exclusionary conditions can be used by the present invention to improve the accuracy of the calculations: excluding highly color saturated pixels, excluding pixels influenced by artificial illumination sources, excluding pixels corresponding to spatially inactive regions, excluding pixels from the lowest relative pixel brightness, and excluding pixels corresponding to under exposure conditions.

As part of the operation of digital image processor 20 in determining the optimum color sensitometry transform 210, a set of exposure dependent gray values for each photographic film strip 12a is derived in the form of a single, three-dimensional functional relationship among the measured three basic color pixel values, such as red, green and blue. This functional relationship represents an exposure-level-dependent estimate of gray for use as values specific to the photographic film strip 12a and the corresponding source digital images 101 derived from the photographic film strip 12a for influencing which pixel values can contribute to the calculation of the color sensitometry transform 210. Conceptually, the functional relationship representing gray is derived by creating a three-dimensional scatter plot of the type illustrated in FIG. 10, which shows a three-dimensional scatter plot of three primary color pixel values corresponding to the measured primary color film densities, such as red, green and blue, within a color space bounded by red, green and blue axes. Although a three-dimensional functional relationship is described herein based on the digital image pixel values corresponding to the three red, green and blue density values on the image frame, it will be appreciated that basic color pixels other than red, green and blue can be scanned to form the basis for the functional relationship. Additionally, the present invention is not limited to three color densities since more than three color densities can be scanned. Consequently, in its broadest form, the present invention contemplates that a multidimensional functional relationship is derived from at least three, and possibly more, scanned color densities of any suitable combination of appropriate colors.

Figure 10:
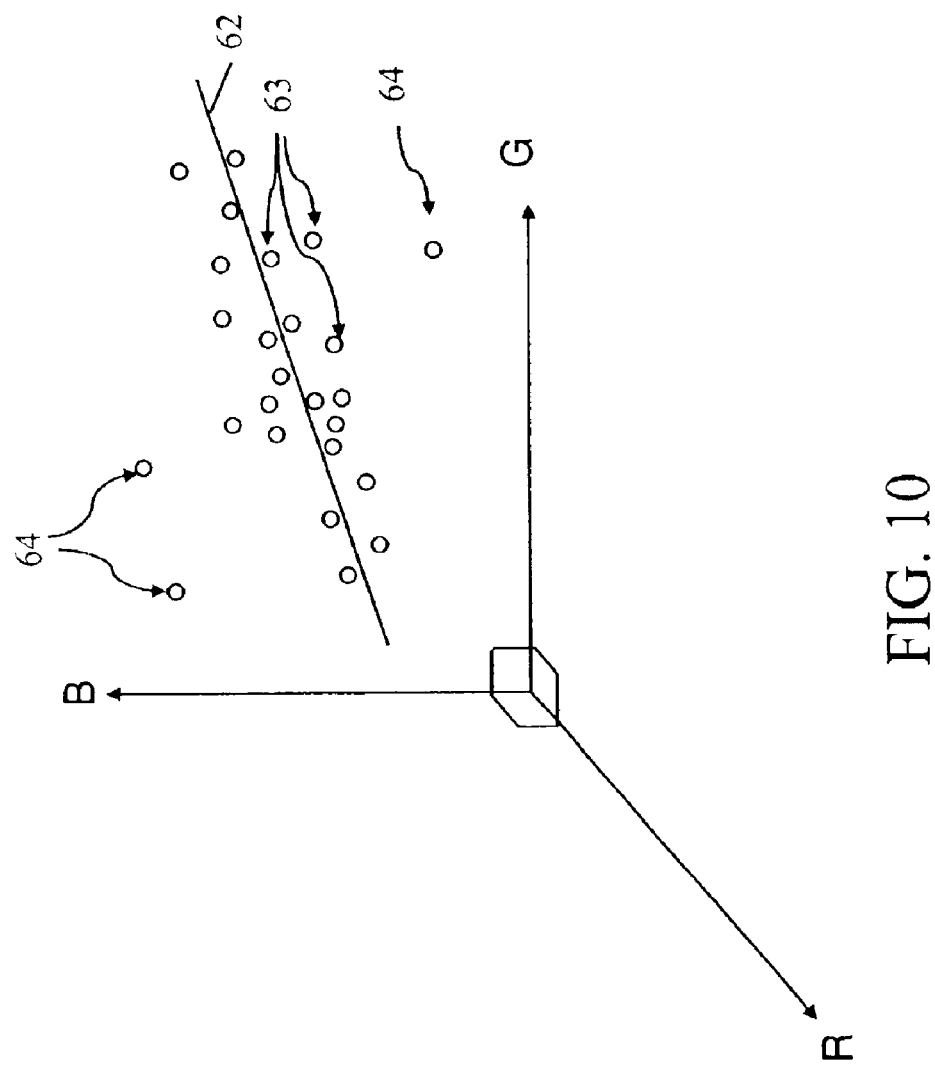
FIG. 10 is a three-dimensional plot of pixel values derived from film density measurements in three basic colors of digital images from a photographic film strip order.

The plotted points shown in FIG. 10 represent measured pixel values for the corresponding colors from regions on the photographic film strip 12a. The functional relationship is established by plotting measured pixel values 63 derived from each of the regions measured by film scanner 21 in the three-dimensional color space and by then fitting a line 62 through the pixel values 63 using any one of the many well known line fitting methods, such as the method of least squares. This fitted line 62 then serves as the exposure-level-dependent estimate of gray for the set of source digital images derived from photographic film strip 12a. While reference is made to conceptually creating a scatter plot, this is done for ease of visualizing the description of the invention. In actual practice, it will be appreciated by those skilled in the art that the color sensitometry transform 210 is created by inputting the pixel value data into the appropriate line fitting algorithm being run by digital image processor 20.

In the above described method, pixel values 63 from all of the measured regions in the included set of analysis digital images were used in creating the scatter plot. It has been found to be advantageous in some instances to exclude pixel data when creating the scatter plot so as to improve the accuracy of the color sensitometry transform 210, i.e. the fitted line 62. For example, pixels with highly saturated colors such as represented by points 64 in the plot of FIG. 10 can bias the fitted line estimate. These high color saturation pixels can be caused by objects in the photographed scene that contain highly saturated colors, an example of which might be bright red clothing. In establishing the color sensitometry transform 210, it is important that the color sensitometry transform 210 mainly represent characteristics of the photographic film strip 12a without bias from these saturated colors in the scene. It is therefore desirable to eliminate the pixel values from these saturated colors from the scatter plot used to establish the color sensitometry transform 210. In order to eliminate the pixel data corresponding to regions of highly saturated colors, it is necessary first to establish a reference point from which saturation values are calculated and then to establish a threshold level relative to the reference point for use in identifying the pixels with highly saturated colors to be eliminated.

Figure 11:
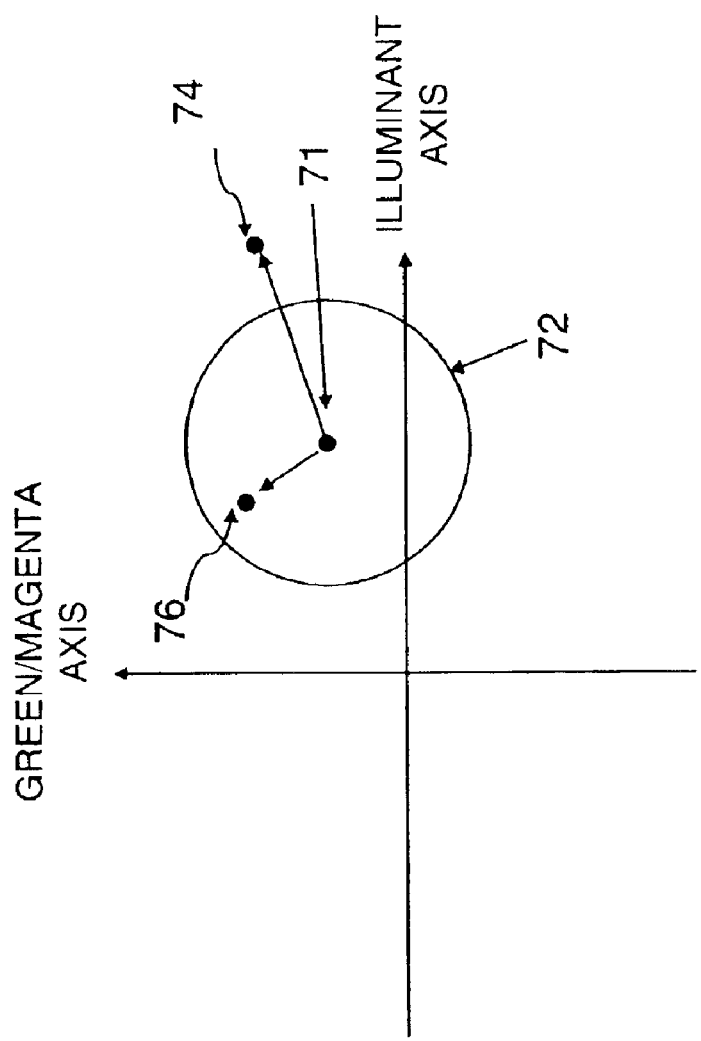
FIG. 11 is a plot of pixel values in a transformed color space useful in describing a method of high saturation color discrimination for individual pixel regions of a digital image.

While various techniques for elimination of highly saturated colors can be employed, the elimination is achieved in a presently preferred embodiment by first transforming the pixel values of the three primary colors into an alternative orthogonal color space in the manner described in commonly assigned U.S. Pat. No. 4,159,174 to Rising, the disclosure of which is incorporated herein by reference. This transformed space is illustrated in the graph of FIG. 11, wherein the three primary color pixel values in three-dimensional space are projected onto a green/magenta, illuminant plane that is perpendicular to a luminance axis. The reference gray point, shown as point 71 in FIG. 11, is established in the following manner.

From the measured pixels values of a plurality of pixel regions derived from the photographic film strip 12a, a set of minimum pixel values ($R_{min}$, $G_{min}$, $B_{min}$) is determined (depicted in FIG. 5). Preferably the pixel regions included for this purpose are taken from both the source digital images 101 and the inter-frame gaps 19 depicted in FIG. 3. The purpose is to identify an area on the photographic film strip, which received no exposure. Normally, this would be expected to be found in the inter-frame gaps 19. However, it is known that for various reasons there can be some exposure, e.g. fogging, in the inter-frame gap regions and for this reason it is desirable to include the source digital image pixel values in determining the minimum pixel values. For some digital imaging systems, the film scanner 21 can not measure the inter-frame gaps 19 and thus for these systems the minimum pixel values must be determined solely from the image pixel data.

Next, the order average pixel values ($R_{av}$, $G_{av}$, $B_{av}$) for all regions within all the analysis digital images are determined. Two sets of values are transformed into the alternative orthogonal color space illustrated in FIG. 11 using the formula given by (4)

$$LUM=(R+G+B)/\sqrt{3}$$
$$GM=(2G-R-B)/\sqrt{6}$$
$$ILL=(B-R)/\sqrt{2} \qquad (4)$$

to obtain green/magenta and illuminant values ($GM_{min}$, $ILL_{min}$) (shown in FIG. 12) and ($GM_{av}$, $ILL_{av}$) corresponding to minimum pixel values ($R_{min}$, $G_{min}$, $B_{min}$) and order average pixel values ($R_{av}$, $G_{av}$, $B_{av}$), respectively. The weighted averages $GM_o$ and $ILL_o$ of these values are derived from the expression (5)

$$GM_o=\alpha GM_{av}+(1-\alpha)GM_{min}$$
$$ILL_o=\beta ILL_{av}+(1-\beta)ILL_{min} \qquad (5)$$

where the weighting values $\alpha$ and $\beta$ are each between 0 and 1 and are empirically determined from inspection of resulting color prints. Representative values that have been found to give good results are approximately $\alpha=0.6$ and $\beta=0.25$. These $GM_o$ and $ILL_o$ values establish the reference point, or initial gray point, shown as point 71 in FIG. 11. It can be noted here, that while the method disclosed in U.S. Pat. No. 4,279,502 performs a saturated color elimination using a calculation of saturation relative solely to minimum density ($R_{min}$, $G_{min}$, $B_{min}$), which corresponds to $GM_{min}$ and $ILL_{min}$ in the FIG. 11 color space, it has been found that this does not always give optimum results. This is believed to be because the gray point determined at minimum density levels does not accurately reflect the gray point corresponding to normal exposure levels. Thus, it has been found to be advantageous to include a measure of average pixel values of regions from within the analysis digital images derived from the photographic film strip 12a when determining the values of $GM_o$ and $ILL_o$. However, it should be noted that while the method of calculation disclosed in U.S. Pat. No. 4,279,502 is less accurate it does have an advantage that it is simpler to implement.

In calculating the saturation of each of the pixels in a digital image, the $i^{th}$ pixel denoted by the subscript "i", the measured color pixel values can preferably be transformed into the alternative orthogonal color space resulting in ($GM_i$, $ILL_i$). A saturation value ($SAT_i$), a measure of color saturation, for a given pixel in an analysis digital image is calculated relative to the reference point ($GM_o$, $ILL_o$) shown as 71 in FIG. 11 as given by (6).

$$SAT_i=((GM_i-GM_o)^2+(ILL_i-ILL_o)^2)^{1/2} \qquad (6)$$

The saturation $SAT_i$ value is then compared to a predetermined threshold value, represented by circle 72. When the saturation $SAT_i$ value is greater than the threshold value, as in the case shown by point 74, the pixel value is excluded in creating the scatter plot of FIG. 10. Data from pixels falling within the threshold value indicated by circle 72, as represented by point 76, are included in the subset used for creating the scatter plot. In terms of the FIG. 10 plot, this would result in exclusion of widely scattered points 64 while the closely scattered points 63 are included. When the red, green, and blue pixel values are transformed to the GM and ILL color space, the threshold radius of circle 72 is 0.15 (in equivalent film density units) in a presently preferred embodiment. The establishment of this threshold is an empirical determination and it will be understood that other threshold values can be established within the scope of this invention. Although the saturation clipping technique illustrated in FIG. 11 is a simple method using a uniform threshold shown by a circle 72 for all color directions (hues), it will be appreciated that it is also possible to have variable threshold values depending on the color direction similar to the subject failure suppression boundaries technique described in the above Goll et al. journal article.

Highly saturated frames can bias the color sensitometry transform 210 ($GM_o$, $ILL_o$). As a further refinement for estimating the values $GM_o$ and $ILL_o$, provision can be made to eliminate highly saturated analysis digital images from the calculation of $GM_o$ and $ILL_o$. For each analysis digital image, the frame average pixel values $GM_{fav}$ and $ILL_{fav}$ are calculated in a manner similar to the calculation of $GM_{av}$ and $ILL_{av}$ as previously described, except that only pixels within an individual analysis digital image are included in the calculation. It will be appreciated that $GM_{av}$ and $ILL_{av}$ represent the average pixel values for all of the analysis digital images and the quantities $GM_{fav}$ and $ILL_{fav}$ represent the average pixel values for an individual analysis digital image. Therefore, the quantities $GM_{av}$ and $ILL_{av}$ can also be calculated by the formulas (7):

$$GM_{av}=(1/N)\Sigma_N GM_{fav}$$
$$ILL_{av}=(1/N)\Sigma_N ILL_{fav} \quad (7)$$

Figure 12:
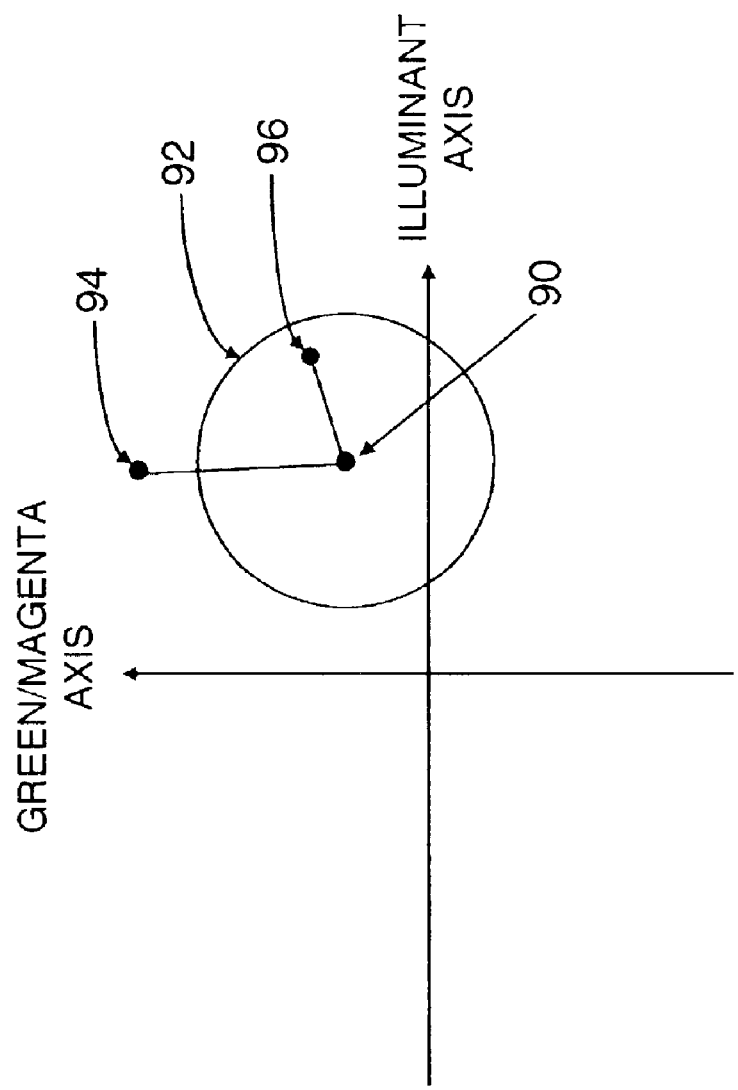
FIG. 12 is a plot of pixel values similar to FIG. 10 used in describing high saturation color discrimination for entire digital images.

Referring now to FIG. 12, the analysis digital image saturation value is calculated relative to the previously described transformed values $GM_{min}$, $ILL_{min}$, point 90 in FIG. 12. A saturation value ($SAT_f$) for a given analysis digital image in the set of analysis digital images is calculated relative to the point 90 ($GM_{min}$,$ILL_{min}$) in FIG. 12 as given by (8).

$$SAT_f=((GM_{fav}-GM_{min})^2+(ILL_{fav}-ILL_{min})^2)^{1/2} \quad (8)$$

The saturation value $SAT_f$ is then compared to a predetermined threshold value, represented by threshold value indicated by circle 92. When the saturation value $SAT_f$ is greater than the threshold value, as in the case shown by point 94, the values $GM_{fav}$ and $ILL_{fav}$ for this analysis digital image are excluded in the calculation of $GM_{av}$ and $ILL_{av}$. Pixel data from analysis digital images falling within the threshold value indicated by circle 92, as represented by point 96, are included in the calculation of $GM_{av}$ and $ILL_{av}$. In the special circumstance in which all the digital images in the set of analysis digital images are excluded by this saturation determination, it will be appreciated that the values of $GM_o$ and $ILL_o$ revert to $GM_{min}$ and $ILL_{min}$, respectively. As in the case of FIG. 11, the threshold value indicated by circle 92 is determined empirically and in a presently preferred embodiment, a value of 0.25 (in equivalent film density units) is used, although other values can be used.

One of the effects of the just described digital image elimination procedure in calculating $GM_o$ and $ILL_o$ is that analysis digital images derived from film exposed with artificial illuminants, e.g. tungsten illumination, are not allowed to contribute to the calculation of the color sensitometry transform 210. In a proposed photographic system of the type described in commonly assigned U.S. Pat. No. 5,229,810 Cloutier et al., data can be recorded in a camera on a magnetic layer formed on the film. These metadata, i.e. nonpixel data information, can include a data flag indicating that a particular image frame has been exposed by artificial illumination. These recorded data can be used advantageously in the present invention by detecting the data flag and causing the pixel values of the corresponding analysis digital images to be excluded in the calculations of $GM_o$ and $ILL_o$ and/or the subsequent line estimate 62 of FIG. 10.

It should also be noted that the analysis digital images with corresponding highly saturated color values for the quantities $GM_{fav}$ and $ILL_{fav}$ often correspond to scenes photographed with artificial illuminant light sources. Therefore, highly color saturated values for the quantities $GM_{fav}$ and $ILL_{fav}$ can be considered an indication of the likelihood that a digital image was derived from a scene photographed with an artificial illuminant light source. It is also possible to calculate the likelihood of a digital image having been derived from a scene photographed with an artificial illuminant light source from other camera metadata. The present invention uses the method disclosed by Wheeler in U.S. Pat. No. 6,133,983 to determine the likelihood of an artificial scene from the camera metadata scene light level and flash-fire signal when this metadata is available to the system. In particular, the method disclosed by Wheeler uses flash-fire and scene brightness value metadata recorded by a camera. Therefore, the present invention uses nonpixel data to indicate the likelihood of the digital image having been derived from a scene photographed with an artificial illumination source to adjust the calculation of the color correction transform.

To reduce the influence of large uniform areas within an analysis digital image that are often dominated by a single color and would have the effect of biasing the line estimate 62 in FIG. 10, i.e. the exposure dependent gray, preferably only pixel data from the high spatial activity, regions of an analysis digital image are included in the scatter plot. High spatial activity regions are determined by detecting edge regions occurring within an analysis digital image with the use of a spatial filter. In a preferred embodiment, a spatial filter operating on a 3 by 3 pixel region matrix is used. The difference between maximum and minimum luminance pixel values for all nine pixels within the matrix is determined. If the difference between the maximum and minimum values, i.e. a local measure of spatial activity, is below a predetermined threshold value, the pixel data are not included in the scatter plot. An effective threshold value for this purpose has been found empirically to be 0.2 neutral density on the film in R,G,B color space. Areas of the analysis digital image with high spatial activity tend to correlate well with those areas of the analysis digital image that contain the subject. Consequently, the use of edge filtering as described above tends to include pixel regions of the analysis digital image that contain the subject and thus provides an improved gray estimate for color balance settings according to the present invention. It will be appreciated that this aspect of spatial filtering makes the spatial filtering technique also useful in determining luminance (i.e. lightness versus darkness balance) exposure settings and in implementing the aforementioned subject failure suppression technique. It will be appreciated by those skilled in the art that other spatial filters can also provide effective measures of spatial activity.

For many photographed scenes, more than one color illuminant source is present. In particular, for scenes in which an electronic flash illumination source was used, a secondary light source was also present in the scene. Usually the secondary light source, often tungsten or fluorescent lamps, have a characteristic color that is quite different than the flash illumination. In addition, the secondary light sources are often of significantly less intensity than the dominant, or primary, flash illumination source. Thus, darker pixel values in a digital image are more likely to have been influenced by the secondary illumination source while brighter pixels values are more likely to have been dominated by the primary illumination source. The present invention further excludes pixels in the analysis digital images from contributing to the calculation of the color sensitometry transform 210 by only including bright pixels. An average luminance pixel value $LUM_{fav}$ is calculated for each analysis digital image. Pixels with corresponding luminance pixel values less than $LUM_{fav}$ are excluded. It will be appreciated that this brightness exclusionary process is adaptive to each analysis digital image and that comparing each pixel to the value $LUM_{fav}$ is a form of calculating a measure of relative pixel brightness within the digital image.

The color of under-exposed regions of images often does not correspond well with the color of properly exposed regions. Therefore, the present invention excludes pixels from contributing to the calculation of the color sensitometry transform 210 by comparing the corresponding luminance pixel value with a predetermined equivalent exposure threshold value shown as 59 in FIG. 8. Pixels with corresponding luminance pixel values given by (1) that are less than the predetermined exposure threshold value are excluded from the calculation of the color sensitometry transform 210. In a presently preferred embodiment, the threshold value was empirically determined to correspond to a properly exposed 6% scene gray reflector. Thus, it will be appreciated that comparing the value of each pixel to a predetermined threshold is a form of calculating a measure of pixel exposure.

The color sensitometry transform 210 is calculated using all the pixels in the set of analysis digital images that have not met one of the above described exclusion conditions. The preferred embodiment of the present invention uses a least squares linear regression technique to calculate the color sensitometry transform 210. First a luminance pixel value $L_i$ is calculated for each pixel triplet given by (9)

$$L_i = (R_i + G_i + B_i)/3. \tag{9}$$

A linear regression of the luminance pixel values $L_i$ against the red pixel values $R_i$ is performed to determine the red slope coefficient $\gamma_R$ and the red offset coefficient $\eta_R$. Similarly the luminance pixel values are regressed against the green pixel values to determine the corresponding green slope coefficient $\gamma_G$ and the green offset coefficient $\eta_G$, and the luminance pixel values are regressed against the blue pixel values to determine the corresponding blue slope coefficient $\gamma_B$ and the blue offset coefficient $\eta_B$. The six determined regression coefficients are used to establish the single multidimensional functional relationship among the colors representing an exposure-level dependent estimate of gray for the set of source digital images. The linear equation described in (10)

$$R_i' = \gamma_R L_i + \eta_R$$
$$G_i' = \gamma_G L_i + \eta_G$$
$$B_i' = \gamma_B L_i + \eta_B \tag{10}$$

shows the relationship between the luminance pixel values and the terms $R_i'$, $G_i'$, and $B_i'$ which represent pixel values that define the multidimensional line of the color sensitometry transform 210.

In an alternative embodiment, the least squares regression is performed on a luminance-chrominance representation of the pixel data. First a luminance value $LUM_i$, a green-magenta value $GM_i$ and an illuminant value $ILL_i$ are calculated using equation (4) from the set of included pixels. A linear regression is then performed of the $LUM_i$ pixel values against the $GM_i$ pixel values to determine the GM slope ($\gamma_{GM}$) and GM offset ($\eta_{GM}$) coefficient. Similarly, the $LUM_i$ pixel values are regressed against the $ILL_i$ pixel values to determine ILL slope ($\gamma_{LL}$) and ILL offset ($\eta_{ILL}$) coefficients. The single multidimensional functional relationship is defined by the two linear prediction equations given by (11)

$$GM_i' = \gamma_{GM} LUM_i + \eta_{GM}$$
$$ILL_i' = \gamma_{ILL} LUM_i + \eta_{ILL} \tag{11}$$

where the $GM_i'$ and $ILL_i'$ terms are predicted pixel values. The slope and offset terms are then used to calculate the red, green, blue multidimensional color sensitometry transform 210 in the form of the three linear equations given above as (10) where the red, green, and blue slope ($\gamma_k$) and offset ($\eta_k$) coefficients are determined from the coefficients $\gamma_{GM}$, $\eta_{GM}$, $\gamma_{ILL}$, and $\eta_{ILL}$. The offset coefficients $\eta_r$, $\eta_g$, and $\eta_b$ are described in terms of $\eta_{GM}$ and $\eta_{ILL}$ as given by (12).

$$\eta_R = -\frac{\sqrt{6}}{6}\eta_{GM} - \frac{\sqrt{2}}{2}\eta_{ILL} \tag{12}$$

$$\eta_G = \frac{\sqrt{6}}{3}\eta_{GM}$$

$$\eta_B = -\frac{\sqrt{6}}{6}\eta_{GM} + \frac{\sqrt{2}}{2}\eta_{ILL}$$

The expressions for the slope coefficients $\gamma_k$, $\gamma_g$, and $\gamma_b$ are described in terms of $\gamma_{GM}$, and $\gamma_{ILL}$ as given by (13).

$$\gamma_R = 1 - \frac{\sqrt{2}}{2}\gamma_{GM} - \frac{\sqrt{6}}{2}\gamma_{ILL} \tag{13}$$

$$\gamma_G = 1 + \sqrt{2}\,\gamma_{GM}$$

$$\gamma_B = 1 - \frac{\sqrt{2}}{2}\gamma_{GM} + \frac{\sqrt{6}}{2}\gamma_{ILL}$$

Although the process of excluding pixels from the regression analysis improves the robustness of the color sensitometry transform 210, an alternative implementation of the present invention imposes the constraint that the minimum pixel values translate to a color neutral position when modified by the color sensitometry transform 210 as a pixel triplet. In other words, the minimum pixel values that correspond to an image region having received no exposure should be transformed to new values that result in a neutral gray color. Mathematically, the constraint is imposed by forcing the multi-linear regression to yield a zero $GM_i'$ and $ILL_i'$ value (see equations (11) and (12)). Thus, the slope and offset coefficients must satisfy the constraint given by (14)

$$\eta_{GM} = -\gamma_{GM} LUM_{min}$$
$$\eta_{ILL} = -\gamma_{ILL} LUM_{min} \tag{14}$$

where the term $LUM_{min}$ is given by (15)

$$LUM_{min} = (R_{min} + G_{min} + B_{min})/\sqrt{3}. \tag{15}$$

The accuracy of the predicted slope coefficients as described by (13) is of fundamental importance to the effectiveness of the present invention. The present invention relies on scene content, i.e. the pixels of the analysis digital images, to predict the slope coefficients related to the underlying film sensitometry. It is possible for some sets of analysis digital images to have scene content that will result in an errant slope coefficient calculation. For example, if the entire set of source digital images was photographed at a single event, such as a golf tournament, many if not all of the source digital images can have the same green grass and blue sky scene content. Consequently, the calculation of the slope coefficients can be biased by the dominant colors of the scene content that is not color neutral. The preferred embodiment of the present invention applies three further constraints on the slope coefficients to improve the accuracy of results relating to 1) a constant correction factor, 2) a statistical goodness of fit criterion, and 3) a visual contrast factor.

The multi-linear regression analysis can result in color sensitometry transform 210s with very large slope coefficients if the pixels included in the regression are colorful even though highly color saturated pixels have been excluded. Thus, large slope coefficients can be produced from naturally occurring scene colors. The present invention also employs a constant proportional factor ($\epsilon$) to modify the slope coefficients to reduce the magnitude of the color sensitometry transform 210 by multiplying the slope coefficients by a correction factor $\epsilon$ as given by (16).

$$\gamma_R' = \epsilon(\gamma_R - 1) + 1$$
$$\gamma_G' = \epsilon(\gamma_G - 1) + 1$$
$$\gamma_B' = \epsilon(\gamma_B - 1) + 1 \tag{16}$$

Experimentation with different correction factors has yielded the best results of the processed digital images with the correction factor $\epsilon$ set in the range of 0.5 to 0.9 with 0.67 used as default value. Therefore, the slope coefficients of the least squares best fit line are modified by a constant proportional factor. Those skilled in the art will appreciate that the present invention can be used effectively with other functional forms that can accomplish the same effect.

For some sets of analysis digital images, the total number of included pixels can still be large enough to yield acceptable results even though many pixels have been excluded by one of the above described criterion. However, the robustness of the color sensitometry transform 210 can be diminished if the number of excluded pixels reaches too high a number. As a further safeguard, the preferred embodiment of the present invention limits the slope coefficients. The present invention uses the magnitude of the chrominance slope coefficients as the figure of merit for applying the maximum slope limit constraint. Experimentation has shown that a value of 0.15 for the maximum chrominance slope coefficient relates to an increased likelihood of inaccurate results. The maximum slope factor $\xi$ is given by (17)

$$\xi = 1.0 \text{ for } \delta < \tau$$
$$\xi = e^{1-(\delta/\tau)^2} \text{ for } \delta >= \tau \tag{17}$$

where the term $\tau$ represents a slope limit control parameter set to 0.125 and $\delta$ represents the magnitude of the chrominance slope coefficients given by (18).

$$\delta = (\gamma_{GM}^2 + \gamma_{ILL}^2)^{1/2}. \tag{18}$$

The resulting modified slope coefficients are given by (19).

$$\gamma_R'' = \xi(\gamma_R' - 1) + 1$$
$$\gamma_G'' = \xi(\gamma_G' - 1) + 1$$
$$\gamma_B'' = \xi(\gamma_B' - 1) + 1 \tag{19}$$

The regression analysis procedure described above generates a set of three linear equations by approximating the pixel data with a line. However, for some sets of digital images the pixel data is not well approximated by a linear equation. The present invention uses the statistical $R^2$ value calculation of regression residual values as a measure of the confidence with which the line fits the pixel data (see Applied Regression Analysis Third Edition, John Wiley & Sons, Inc.). The $R^2$ value for the regression is a normalized value that ranges from 0.0 to 1.0 that relates to the percentage of the total variance that can be explained by the regression line. High $R^2$ values relate to well fit data and thus a high degree of confidence in the regression line. The function that relates the calculated $R^2$ value for the regression (a weighted combination of the red, green, and blue $R^2$ values is used) to the regression confidence factor $\mu$ is given by (20).

$$\mu = 1 \text{ if } R^2 > \mu_1$$
$$\mu = 0 \text{ if } R^2 < \mu_1$$
$$\mu = (R^2 - \mu_1)/(\mu_1 - \mu_1) \text{ if } \mu_o <= R^2 <= \mu_1 \tag{20}$$

The $R^2$ modifying factor $\mu$ is used to adjust the slope coefficients as given by (21)

$$\gamma_R''' = \mu(\gamma_R'' - 1) + 1$$
$$\gamma_G''' = \mu(\gamma_G'' - 1) + 1$$
$$\gamma_B''' = \mu(\gamma_B'' - 1) + 1 \tag{21}$$

where the $\gamma'''_R$, $\gamma'''_G$, and $\gamma'''_B$ terms represent the final adjusted slope coefficients including the combined effects of the visual weighting, the slope correction, the maximum slope difference limiting, and the regression confidence factor.

When all the above mentioned modifications are made to the slope coefficients, including the correction factor $\epsilon$, the maximum slope differential factor $\xi$, and the regression confidence factor $\mu$, the final expression for the modified slope coefficients is given by (22).

$$\gamma_R''' = (\mu\xi\epsilon(\gamma_R - 1) + 1)$$
$$\gamma_G''' = (\mu\xi\epsilon(\gamma_G - 1) + 1)$$
$$\gamma_B''' = (\mu\xi\epsilon(\gamma_B - 1) + 1) \tag{22}$$

The linear equations described in (10) relate to the predicted photo response curves. The linear equations that form the color sensitometry transform 210 are constructed to correct the predicted line equation and are therefore the mathematical reflection about the 1-to-1 line of the predicted line equation. The actual slope coefficients $\Gamma_R$, $\Gamma_G$, and $\Gamma_B$, red, green, and blue respectively, used to generate the color sensitometry transform 210 are given by (23).

$$\Gamma_R = 1/\gamma_R'''$$
$$\Gamma_G = 1/\gamma_G'''$$
$$\Gamma_B = 1/\gamma_B''' \tag{23}$$

The mathematical analysis described above uses an equal weighting of red, green and blue pixel values to form the luminance pixel values. The color sensitometry transform 210 produced with this equal weighting luminance pixels can impart a change in the visual contrast characteristics to the processed digital images. To reduce this effect, the preferred embodiment of the present invention uses a visual weighting constraint imposed on the actual slope coefficients $\Gamma_R$, $\Gamma_G$, and $\Gamma_B$. A visual weighting factor $\rho$ is given by (24).

$$\rho = 0.414 \, \Gamma_R + 0.507 \, \Gamma_G + 0.079 \, \Gamma_B \quad (24)$$

The visual weighted slope coefficients $\Gamma_R'$, $\Gamma_G'$, and $\Gamma_B'$ are given by (25).

$$\Gamma_R' = \Gamma_R/\rho$$

$$\Gamma_G' = \Gamma_G/\rho$$

$$\Gamma_B' = \Gamma_B/\rho \quad (25)$$

It will be appreciated by those skilled in the art that while the present invention empirically derived the relative weights for the red, green, and blue contributions as given by (16), other visual weights can also be useful such of 0.30, 0.59, and 0.11 respectively. It should also be noted that these coefficients are based on the spectral characteristics of the intended final image print material and can vary from one material to another.

With the inclusion of the color sensitometry transform 210 as a component of the color correction transform, each pixel of each source digital image is transformed using the equation as given by (26)

$$R_i' = \Gamma_R' R_i - \eta_R \, \Gamma_R'$$

$$G_i' = \Gamma_G' G_i - \eta_G \, \Gamma_G')$$

$$B_i' = \Gamma_B' B_i - \eta_B \, \Gamma_B')$$

where the terms $\Gamma_R'$, $\Gamma_G'$ and $\Gamma_B'$ represent the slope coefficients for red, green and blue as described in equations (25), $R_i$, $G_i$, and $B_i$ represent the red, green, and blue source pixel values and $R_i'$, $G_i'$, and $B_i'$ represent the modified pixel values with the color sensitometry transform 210. The present invention uses a look-up-table (LUT) to implement the color sensitometry transform 210 denoted as $T_1[\ ]$.

It is important to note that color sensitometry transform 210 fundamentally changes the color of pixels relating to different levels of exposure with different levels of color correction. Thus, the color correction transform adjusts the color of pixels within a digital image with varying degrees of color modification as a function of exposure. Also, since the color sensitometry transform 210 incorporates the exposure-level-dependent estimate of gray using a least squares regression equation, the color correction transform incorporates a linear exposure-level-dependent estimate of gray. The net effect of the sensitometry correction is to correct the color of pixels to a greater degree the farther they are from the gray balance point.

The film scanner 21 described above records from the periphery of the separate photographic film strips 12$a$ an encoded bar code, i.e. a series of exposed lines which when decoded can be interpreted as a number indicating the unique manufactured type of photographic film. Stored in the general control computer 40 is a database of film type identification tags that uniquely identify the type of photographic film. For most types of manufactured photographic film products, the application of the color sensitometry transform 210 to the derived source digital images does improve the color appearance of the processed digital images. However, there are some photographic film products that have excellent color-neutral sensitometry characteristics. Consequently, the constraints for the color sensitometry transform 210 can be adjusted for these well behaved products. The present invention stores a data base of photographic film types that have well behaved color-neutral sensitometry characteristics and adjusts the value for the correction factor $\epsilon$ to 0.5 as described above for the digital images derived from such photographic film strips 12$a$. Similarly, for photographic film types that do not have well behaved color-neutral sensitometry the value for the correction factor $\epsilon$ is set to 0.9. Thus, the information recorded on the photographic film that uniquely identifies the type of photographic film material is used to selectively apply the step of applying the color sensitometry transform 210.

The primary implementation of the present invention, in the context of a digital photofinishing system, calculates the color sensitometry transform 210 from digital images derived from a single photographic film strip 12$a$ that was received by the system. This is primarily done because the color sensitometry of a single photographic film strip corresponds to a single type of photographic film. Other photographic film strips corresponding to different types of photographic films, in general, do not have the same color sensitometry characteristics. However, other photographic film strips 12$a$ that correspond to the same photographic film type but are received from different consumers do have similar color sensitometry characteristics. An alternative embodiment of the present invention uses the digital images derived from multiple photographic film strips 12$a$ received from different consumers corresponding to the same photographic film type, as indicated by the encoded bar code as described above, to calculate a color sensitometry transform 210 for and apply to the digital images derived from the multiple photographic film strips 12$a$.

The above description of the color sensitometry transform 210 refers to a process that excludes pixels from contributing to the calculation of a number of different quantities, e.g. the quantities $GM_{av}$, $ILL_{av}$, $GM_{fav}$, $ILL_{fav}$, $GM_o$ and $ILL_o$. While binary exclusion logic is simple to implement and has the advantage of fast execution speed, an alternative embodiment of the present invention uses weighting factors that vary between 0.0 and 1.0 to vary the degree to which pixels contribute to the various above mentioned quantities. This exclusionary weighting logic is more complicated to implement and more time consuming to execute in computer hardware. However, exclusionary weighting logic does provide a greater overall degree of transform robustness due to the gradual nature of the decision logic. For this embodiment the predetermined saturation threshold represented by circle 72 in FIG. 11 now represents the locus of equal weighting factors in the chrominance diagram. A two dimensional Gaussian weighting surface is used to vary the degree of pixel exclusion. Similarly, predetermined saturation threshold value represented by circle 92 in FIG. 12 now represents the locus of equal weighting factors.

The sensitometry curves for the red, green, and blue photo response curves for a typical photographic film product are illustrated in FIG. 5. The photo response curves of FIG. 5 show considerable differences between the absolute film densities for the three color records and differences in slope. After the application of the color sensitometry transform 210, the photo response curves have been transformed as illustrated in FIG. 6. The slope mismatches between the three color records have been minimized and the absolute differences between the three color records have also been removed by the application of the color sensitometry transform 210 for pixels derived from the photographic film which received a sufficient exposure of light (as indicated by 54 in FIG. 6). However, the under-exposure domain (as indicated by 55 in FIG. 6) of the photo response curves still has slope (contrast) and density (color balance) differences among the three color records.

The under-exposure color transform 220 is designed to remove the residual color cast for pixels that relate to the under-exposed regions of a photographic film strip 12a. This transform takes the form of three one-dimensional functions (implemented with LUT's) that graduate changes to the pixels as a function of the pixel values. The mathematical formula for the under-exposure color transform 220 is given by (27)

$$R''_i = R'_i + (L'_{min} - R'_{min})e^{-\alpha_r(R'_i - R'_{min})}$$

$$G''_i = G'_i + (L'_{min} - G'_{min})e^{-\alpha_g(G'_i - G'_{min})}$$

$$B''_i = B'_i + (L'_{min} - B'_{min})e^{-\alpha_b(B'_i - B'_{min})} \quad (27)$$

where the terms $R'_i$, $G'_i$, and $B'_i$, represent the red, green, and blue pixel values to be processed, $R''_i$, $G''_i$, and $B''_i$ represent the red, green, and blue pixel values processed by the under-exposure color transform 220, $R'_{min}$, $G'_{min}$, and $B'_{min}$ represent the minimum pixel values as processed by the color sensitometry transform 210, and $L'_{min}$ represents the luminance pixel value corresponding to $R'_{min}$, $G'_{min}$, and $B'_{min}$ given by (28).

$$L'_{min} = (R'_{min} + G'_{min} + B'_{min})/3. \quad (28)$$

The terms $\alpha_r$, $\alpha_g$, and $\alpha_b$ are exponential constants that graduate the change in color and are given by (29)

$$\alpha_r = R'_o - R'_{min} - \log_e(\upsilon)$$

$$\alpha_g = G'_o - G'_{min} - \log_e(\upsilon)$$

$$\alpha_b = B'_o - B'_{min} - \log_e(\upsilon) \quad (29)$$

where the constant $\upsilon$ is set to 0.02. The terms $R'_o$, $G'_o$, and $B'_o$ represent the red green, and blue pixel values corresponding to a properly exposed 18% gray reflector (indicated by 56 in FIG. 6). For a typical photographic film, these values represent a minimum exposure for which the film product has achieved a nearly linear photo response. $R'_o$, $G'_o$, and $B'_o$ are calculated by identifying the pixel values corresponding to a density 0.68 above $L'_{min}$. FIG. 7 illustrates the photo response curves after having applied the under-exposure color transform 220. The photo response curve for the under-exposed domain pixels (indicated by 57) has a significantly reduced color mismatch. Thus, it will be appreciated by those skilled in the art that the under-exposure color transform 220 incorporates a non-linear adjustment of the color of pixels that relate to an under-exposure condition.

Figure 8:
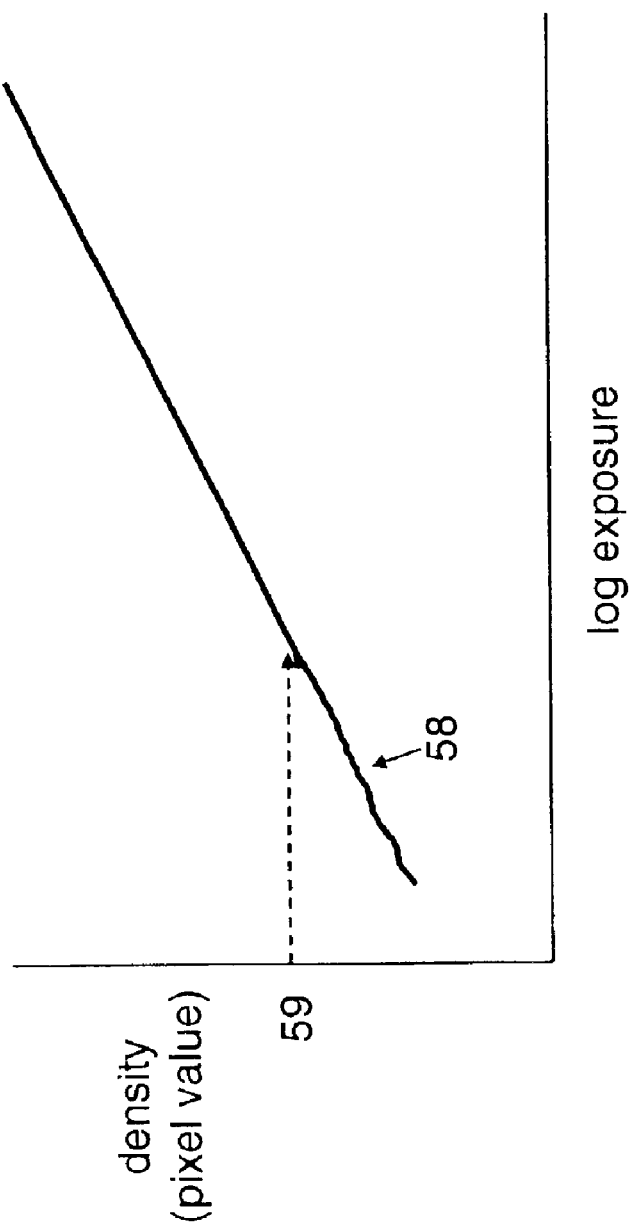
FIG. 8 is a graph showing the photo response of typical photographic film product after having the contrast sensitometry transform applied.

The next component transform calculated in step 4 of FIG. 4 is the contrast sensitometry transform 230 which is designed to compensate for the non-linear under-exposure photo response of the photographic film. The present invention uses the method disclosed by Goodwin in U.S. Pat. No. 5,134,573. The contrast sensitometry transform LUT consists of a non-linear LUT, shown as 91 in FIG. 14, that is applied individually to the red, green, blue, pixel data. The resulting photographic response for a typical photographic film is depicted in FIG. 8. Note the under-exposed response domain (indicated by 57 in FIG. 7) has been linearized (indicated by 58 in FIG. 8).

Figure 13:
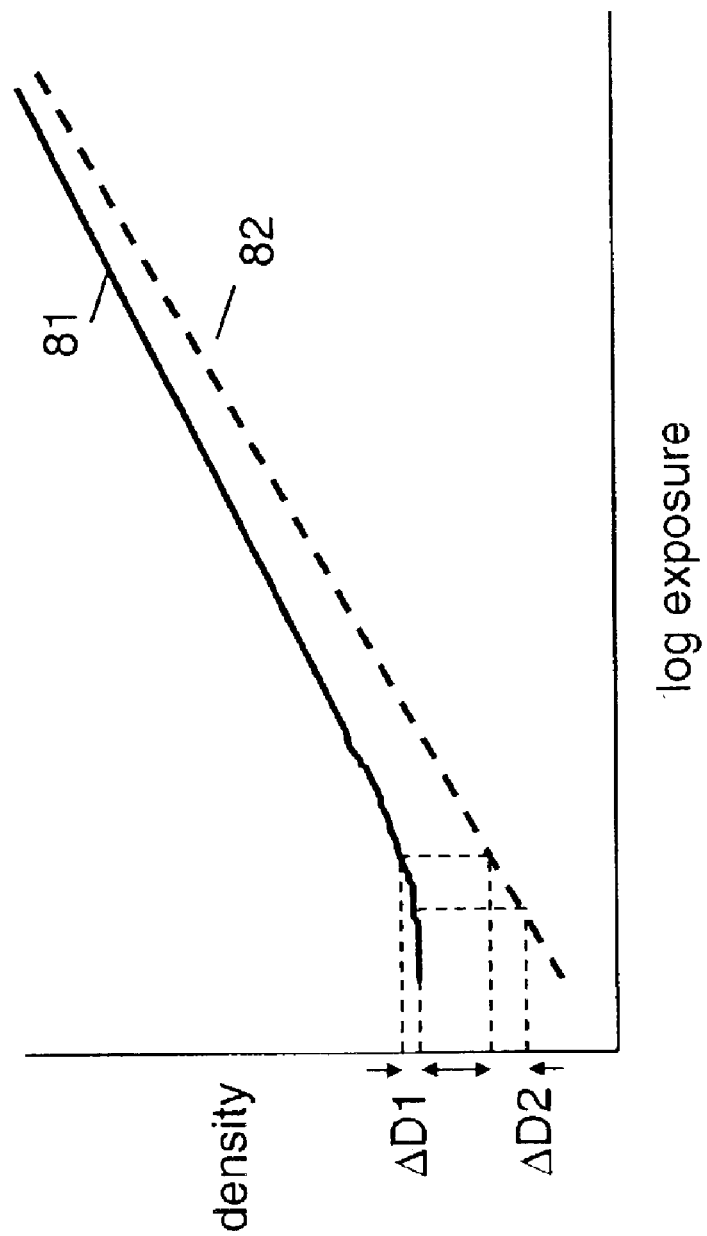
FIG. 13 is a graph showing the photo response of typical photographic film product used to calculate the contrast sensitometry transform.

The method taught by Goodwin states that the linear sensitometric response range of digital images captured on photographic film can be increased by applying a LUT constructed using a mathematical formula intended to invert the natural sensitometric response of the photographic film. In particular, the slope corresponding to the under-exposure domain of a photographic film's standard density to log exposure (D-LogE) curve can be restored. Referring to FIG. 13, a slope parameter $\phi$ describes the adjustment in slope, which theoretically would result in the under-exposure portion of a photographic film sensitometric curve, and is given by (30)

$$\varphi = \frac{\Delta D2}{\Delta D1} \quad (30)$$

where $\Delta D1$ represents the density difference which would result in the actual film response curve (indicated by 81 in FIG. 13) from two nearly equal exposures, and $\Delta D2$ represents the corresponding density difference which would result in the linearized film response curve (indicated by 82) from the same two exposures. The slope parameter $\phi$ represents the slope adjustment to be applied to a digital image at each density level. However, for the under-exposure portion of the D-LogE curve, as the slope approaches zero, $\Delta D1$ approaches zero and the slope adjustment will increase without limit, approaching infinity. This will amplify the noise characteristics in the processed digital image and can result in visually objectionable noise. An allowed maximum slope adjustment is specified by the parameter $\phi_{max}$. Slope adjustments below $\phi_{max}$ are gradually reduced to 1. In that case, the parameter $\phi$ is substituted by $\phi'$ given by (31)

$$\varphi' = \varphi \text{ if } \varphi < \varphi_{max} \quad (31)$$

$$\varphi' = 1 + \frac{A}{B + e^{(C\varphi - D)}} \text{ if } \varphi >= \varphi_{max}$$

where A, B, C, and D are constants which depend upon the maximum slope adjustment. The amount of expected noise contained in the input digital image will affect the selection of optimal parameters A, B, C, D and $\phi_{max}$.

A less complex mathematical formula for slope adjustments below $\phi_{max}$ can be formulated. For the case of $\phi$ less than $\phi_{max}$, the slope parameter $\phi$ is substituted by $\phi'$ given by a simple functional relationship (32):

$$\varphi' = \varphi \text{ if } \varphi < \varphi_{max} \quad (32)$$

$$\varphi' = 1 + \frac{\varphi_{max} - 1}{K + (\varphi - \varphi_{max})^2} \text{ if } \varphi >= \varphi_{max}$$

where the parameter K establishes the rate of convergence of the function to a minimum value of 1.0. In the preferred embodiment of the present invention K is set equal to 0.5.

The photographic response to light is a characteristic of each manufactured film product. However, photographic films of equivalent photographic speed, i.e. ISO rating, have similar response curves. The present invention groups all photographic film products into ISO speed categories—one category for ISO 100, 200, 400, 800, below 100, and above 800. A representative photographic film product is selected for each of the ISO speed categories. For each selected photographic film product, the photo response is measured by photographing a reference photographic film strip, which includes gray, i.e. color neutral, patch targets that range in reflectance value. This is accomplished by analyzing the digital images derived from the reference photographic film strip using the film scanner 21. The contrast sensitometry transform 230 is generated from the measured data. The film scanner 21 is used to determine the ISO of the photographic film strip 12a using the stored film type identification tags in the general control computer 40. The database of sensitometric contrast transforms for each ISO speed type are stored in the general control computer 40. For each set of digital images processed, the photographic speed of the photographic film strip 12a is identified and the corresponding sensitometric contrast transform is selected.

Figure 14:
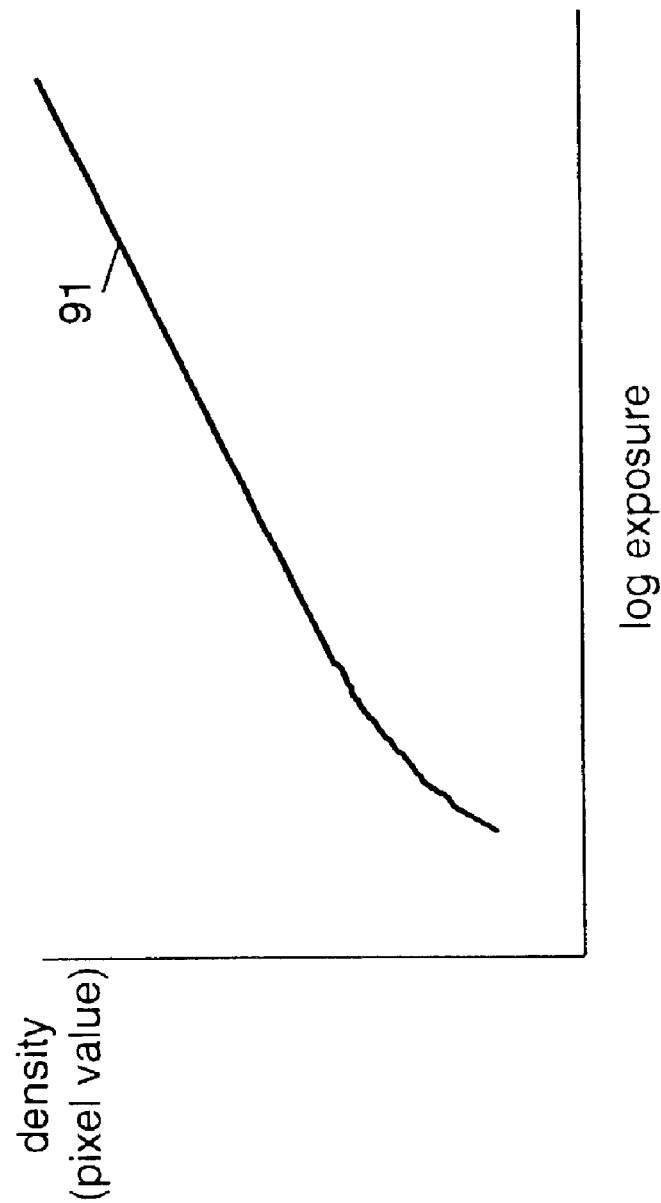
FIG. 14 is a graph showing the shape of the contrast sensitometry transform.

The contrast sensitometry transform 230 is calculated by a numeric integration of the function (31) resulting in a LUT relating the measured density to the "linearized" density. A luminance signal response curve is calculated as the average response of the red, green, and blue pixels derived from the reference photographic film strip data. The luminance minimum pixel value is used as the starting pixel value for the numerical integration procedure. A typical contrast sensitometry transform LUT is shown in FIG. 14 (denoted as 91). Thus, it is shown that the contrast sensitometry transform 230 is a non-linear component color transform that raises the contrast of pixels relating to an under-exposure condition.

The contrast sensitometry transform LUT is applied to the pixel data in the following manner. First the corresponding color minimum pixel values $R_{min}"$, $G_{min}"$, and $B_{min}"$ ($R_{min}$, $G_{min}$ and $B_{min}$ transformed with $T_2[T_1[\ ]]$) are subtracted from the $R_i"$, $G_i"$, and $B_i"$ pixel values (source digital image pixels transformed with $T_2[T_1[\ ]]$). Then the contrast sensitometry transform LUT represented as $T_3[\ ]$ as given by (33) is applied $$R_i'''=T_3[R_i"-R_{min}"]$$
$$G_i'''=T_3[G_i"-G_{min}"]$$
$$B_i'''=T_3[B_i"-B_{min}"] \quad (33)$$

where $R_i'''$, $G_i'''$ and $B_i'''$ represent the contrast sensitometry transformed pixel values.

The present invention calculates a color balance transform 240 designed to remove an overall color cast identified corresponding to a mid-tone gray object for each source digital image. The color balance transform 240 is calculated in two parts. The first part includes the calculation of color-neutral balance values ($GM_k$ and $ILL_k$) for the $k^{th}$ source digital image by calculating a second color sensitometry transform. The second part includes the calculation of color balance values ($GM_b$ and $ILL_b$) uniquely for each source digital image using a weighted average of the pixels values. The color balance transform 240 subtracts color balance values from the pixel values of the corresponding processed source digital image.

The application of the above described color sensitometry transform to the set of source digital images is generally effective for correcting the deficiencies in the color sensitometric response of the photographic film. However, the color of under-exposed regions (regions receiving low levels of light) of the photographic film strip 12a are not as well corrected for color as the normally exposed regions (regions receiving sufficient levels of light). Therefore, the present invention calculates a second color sensitometry transform. The second color sensitometry transform is used to determine a color cast for each individual source digital image that relates to the residual color sensitometry errors. This color cast, in the form of a linear subtractive color balance, values and forms the first part of the color balance transform 240.

In similar fashion, the calculation of the second color sensitometry transform starts by processing the analysis digital images through the preceding component transforms $T_1[T_2[[T_3[\ ]]]$ to produce second analysis digital images. These second analysis digital images are used to generate the second color sensitometry transform.

As described above, the functional relationship three-dimensional line is fit, as depicted by line 62 of FIG. 9, uses the method of least squares to determine the best fit line. This best fit line serves as an exposure-level-dependent estimate of gray for the set of second analysis digital images. For this calculation of the exposure-level-dependent estimate of gray the functional relationship can have a non-linear form of a second order polynomial. The frame average value $LUM_{fav2}$ is calculated for each second analysis digital image in the same manner as described above. The values $GM'_{fav2}$ and $ILL'_{fav2}$ are calculated using the method described above using the second color sensitometry transform and represents the color-neutral balance values ($GM_k$, $ILL_k$) for the $k^{th}$ source digital image.

In the case of a digital image for which a significant percentage of the pixel regions have pixel values near the minimum pixel values $R_{min2}"$, $G_{min2}"$, $B_{min2}"$ denoting the values Of $R_{min}$, $G_{min}$, and $B_{min}$ as transformed by the transform $T_3[T_2[T_1[\ ]]]$), the second color sensitometry transform determined by the single, three-dimensional functional relationship (indicated by line 62 in FIG. 10) can not give optimum results for some film types. In this instance, it is desirable to adjust the color balance values to accommodate these digital images corresponding to low film exposures. This can be accomplished by adjusting the color balance values for the $k^{th}$ source digital image ($GM_k$, $ILL_k$). The $GM_k$, $ILL_k$ values are adjusted by proportionate amounts of $GM_{fav2}"$, $GM_{min2}'$ and $ILL_{fav2}"$, $ILL_{min2}'$ by transforming the red, green and blue pixel values into luminance pixel values in the orthogonal color space of FIG. 11 where the luminance axis is perpendicular to the green/magenta and illuminant axes. The percentage ($\pi$) of low luminance pixel regions within the second analysis digital image is determined by counting pixels with luminance pixel values that are below an empirically determined luminance threshold, $N_t$, and dividing by the total number of regions in the digital image. A weighting factor $\omega$ is defined by (34)

$$\omega = \frac{\pi - \pi_o}{1 - \pi_o} \text{ for } \pi >= \pi_o \quad (34)$$
$$\omega = 0 \text{ for } \pi < \pi_o$$

where $\pi_o$ is an empirically determined threshold percentage of low density regions to the total number of regions in the digital image. The color balance values $GM_k$, $ILL_k$ for the $k^{th}$ source digital image are determined by the following equation (35)

$$GM_k'=(1-\omega)GM_k+\omega q\ GM_{fav2}'+\omega(1-q)GM_{min2}'$$
$$ILL_k'=(1-\omega)ILL_k+\omega q\ ILL_{fav2}'+\omega(1-q)ILL_{min2}' \quad (35)$$

where q is a smoothing parameter between $GM_{fav2}'$, $GM_{min2}'$ and $ILL_{fav2}'$, $ILL_{min2}'$, and have values between 0 and 1 and $GM_k'$ and $ILL_k'$ represent the adjusted color balance values.

Individual images photographed on the same photographic film strip 12a can have a unique color cast principally due to the uniqueness of the color of the scene illumination source, e.g. tungsten, electronic flash, daylight, overcast, etc. As a further refinement of the color balance transform 240, the present invention calculates color balance values for each source digital image using a color weighted average of the pixels of the corresponding second analysis digital image with a two dimensional Gaussian weighting surface designed to remove the effects of the scene illumination source color. The previously defined color balance values ($GM_k$, $ILL_k$) serve as the center coordinates of the Gaussian weighting surface. The color balance values are calculated using the formula given by (36)

$$GM_b = GM_k + \Sigma_i\, GM_i\, \lambda$$
$$ILL_b = ILL_k + \Sigma_i\, ILL_i\, \lambda \qquad (36)$$

where the Gaussian weighting factor $\lambda$ is given by (37)

$$\lambda = e^{-(GM_i - GM_k)^2/2\,\sigma_{GM}^2 - (ILL_i - ILL_k)^2/2\,\sigma_{ILL}^2} \qquad (37)$$

and the terms $GM_i$ and $ILL_i$ represent the chrominance values of the individual pixels of a second analysis digital image. The variables $\sigma_{GM}$ and $\sigma_{ILL}$ determine the aggressiveness of the color balance transform 240 for removing color casts. Reasonable values for the variables $\sigma_{GM}$ and $\sigma_{ILL}$ have been empirically determined to be 0.05 and 0.05 (in equivalent film density units) respectively. Although the present invention uses a Gaussian function to weight the chrominance values, those skilled in the art will recognize that other mathematical functions can be used with the present invention. The most important aspect of the weighting function is the property of weighting large magnitude chrominance values less than small magnitude chrominance values.

While the above description has concentrated on the application of the present invention for processing digital images derived from photographic film products, the present invention can also be used to enhance the color appearance of digital images derived from digital cameras. In general, the photo response of digital images is linear. However, there can be color biases in digital images produced with a particular digital camera due to the color filter material employed, the in-camera digital image processing, miscalibration, etc. For the application of the present invention for digital camera images the values of the minimum pixel values $GM_{min}$ and $ILL_{min}$ are set to zero.

The use of the present invention can be detected in another digital photofinishing system through the use of controlled imagery that has been specifically designed to diagnose color sensitometry problems. For example, a set of test scenes, one of which contains a set of reflective gray patch targets within the photographed scenes, are produced and photographed with a photographic film product known to have aberrant color sensitometry characteristics. The same set of test scenes is photographed with a photographic film product that has minimal color sensitometry characteristic problems. Both photographic film strips are chemically processed to produce developed images and are scanned on a film scanner to produce a set of source digital images. The digital image corresponding to the test scene containing the reflective gray patch targets derived from the photographic film product without color sensitometry problems (the charlatan image) is then included in the set of digital images derived from the photographic film product with the aberrant color sensitometry. This group of source digital images is then used to synthetically expose, with a digital film writing device, a diagnosis photographic film strip (using a photographic film product without color sensitometry problems). This diagnosis photographic film strip has the equivalent color sensitometry characteristic problems of the aberrant photographic film product for all of the exposed images except the image derived originally from the non-aberrant photographic film. The diagnosis film strip is then processed with the digital photofinishing system in question. The photographic prints are then visually inspected and assessed with regard to the level and color direction of the color correction achieved. If the present invention is being utilized by the system in question, the photographic prints originally derived from the aberrant photographic film product will be corrected for the density dependent color sensitometry induced effects and have an excellent overall color reproduction. However, the photographic print derived from the charlatan digital image, which was not affected by the aberrant color sensitometry, should be adversely corrected by the implementation of the present invention. The photographic print derived from the charlatan digital image will have induced color problems which is the inverse of the original color problem. To confirm this effect, the film produced with the photographic film product without color sensitometry problems is also printed on the system in question and photographic prints generated. The photographic prints of the charlatan digital image are compared. If these two renditions of the same scene content look substantially different, it can be inferred that the color reproduction of the charlatan image is affected by the color sensitometry of the other images contained on the same photographic film strip. In addition, it is possible to formulate the test by setting up test photographic film strips of images with a prescribed color mismatch property and, upon analysis of the results, determine the percentage of correction performed through densitometry measurements.

It is also possible to detect the use of the present invention in another system through the use of uncontrolled aberrant imagery. For example, a series of test scenes can be photographed with different manufactured types of photographic film strips. These types of photographic film strips are selected such that some of the photographic film strips are expected to have aberrant sensitometry while others are not expected to have aberrant sensitometry. The test strips are chemically processed and printed on the system in question as described above. The photographic prints are then visually inspected and assessed with regard to the level and color direction of the color correction achieved. Although this alternative test is not as definitive as the method described above, it is simple to implement.

The invention has been described in detail with particular reference to certain preferred embodiments thereof, but it will be understood that variations and modifications can be effected within the spirit and scope of the invention.

Parts List

10 film scanner
10a image input device
10b image input device
10c image capture device
12 length of film
12a photographic film strip
13 adhesive connector
14 supply reel
15 notches
16 splice detector
17 original image frames
18 notch detector
19 inter-frame gaps
20 digital image processor
21 film scanner
22 take-up reel
24 scanner computer
30 image output device
30a image output device 30b image output device
40 general control computer
50 monitor device
51 red response
52 green response
52 blue response
54 sufficient exposure response
55 under-exposure response Parts List 56 18% gray reflector
57 under-exposure domain
58 under-exposure domain
59 sufficient exposure domain
60 input control device
62 fitted line
63 measured pixel values
64 measured pixel values
70 computer memory device
71 point
72 circle
74 point
76 point
81 actual film response curve
82 linearized film response curve
90 point
91 contrast sensitometry transform LUT
92 circle
94 point
96 point
101 source digital images
102 color corrected digital images
210 color sensitometry transform
220 under-exposure color transform
230 contrast sensitometry transform
240 color balance transform
250 spatial filter

What is claimed is:

1. A method of transforming the color appearance of a plurality of digital images including the steps of:
  a) receiving a plurality of digital images from a capture medium wherein each digital image includes a plurality of pixel values relating to at least three basic colors;
  b) calculating a color correction transform by using:
    i) a non-linear adjustment that is independent of the digital images and which corrects an under-exposure condition as a function of the capture medium; and
    ii) a linear functional relationship dependent upon the pixels of the basic colors, the linear functional relationship defining an exposure-level-dependent estimate of gray corresponding to the photographic response of the capture medium; and
  c) using the color correction transform to modify the pixels of the plurality of digital images wherein the pixels within a digital image are transformed with varying degrees of color modification as a function of exposure.

2. The method of claim 1 wherein the linear functional relationship is calculated using a least squares best fit line based on pixel values of the digital images.

3. The method of claim 1 wherein the color correction transform incorporates a non-linear component color transform that raises the contrast of pixels that relates to an under-exposure condition.

4. The method of claim 1 further including the step of calculating color balance values uniquely for each digital image, and using the color balance values to modify the color appearance of the corresponding digital image.

5. The method of claim 1 wherein calculating the color correction transform further includes:
  calculating a first component color transform that incorporates the exposure-level-dependent relationship;
  modifying the pixels of the digital images with the first component color transform;
  calculating a second component color transform; and
  further modifying the pixels of the digital images with the second component color transform.

6. The method of claim 1 wherein the digital images are derived from an original photographic film strip.

7. The method of claim 6 further including the steps of:
  determining a minimum pixel value for each of the plurality of pixel colors; and
  using the minimum pixel values to calculate the color correction transform.

8. The method of claim 7 wherein the pixels included in the plurality of digital images are used to determine the minimum pixel values.

9. The method of claim 7 wherein the pixels derived from inter-frame gap regions of the original photographic film strip are used to determine the minimum pixel values.

10. The method of claim 1 wherein step b) further includes:
  analyzing the digital images to detect the likelihood of each digital image having been derived from a scene photographed with an artificial illumination light source; and
  rejecting the pixels of digital images determined to have a high likelihood from contributing to the calculation of the color correction transform.

11. The method of claim 10 further including the steps of:
  calculating a frame average pixel value for each color and for each digital images;
  determining a minimum pixel value for each of the plurality of pixel colors; and
  using the difference between the minimum pixel values and the frame average pixel values corresponding to an individual digital image to calculate the likelihood of each individual digital image having been derived from a scene photographed with an artificial illumination source.

12. The method of claim 1 wherein step b) further includes:
  receiving nonpixel data for the plurality of digital images;
  using the nonpixel data to indicate the likelihood of the digital image having been derived from a scene photographed with an artificial illumination source; and
  using the pixels of digital images indicated to have a high likelihood to adjust the calculation of the color correction transform.

13. The method of claim 11 further including the steps of:
  using the frame average pixel values and the minimum pixel values to calculate an order average pixel value for each of the plurality of colors;
  calculating an initial gray point from a weighted average of the minimum pixel values and the order average pixel values; and
  using the initial gray point to calculate the color correction transform.

14. The method of claim 1 further including the steps of calculating a measure of color saturation for pixels of the digital images and using the measure of color saturation to vary the degree to which the pixel contributes to the calculation of the color correction transform.

15. The method of claim 13 further including the steps of using the initial gray point to calculate a measure of color saturation for pixels of the digital images and using the measure of color saturation to vary the degree to which the pixel contributes to the calculation of the color correction transform.

16. The method of claim 1 wherein step b) further includes calculating a measure of spatial activity for pixels of the digital images and using the measure of spatial activity to vary the degree to which the pixel contributes to the calculation of the color correction transform.

17. The method of claim 13 further including the steps of calculating a measure of spatial activity for pixels of the digital images and using the measure of spatial activity to vary the degree to which the pixel contributes to the calculation of the color correction transform.

18. The method of claim 1 wherein step b) further includes calculating a measure of relative pixel brightness for pixels of the digital images and using the measure of relative pixel brightness to vary the degree to which the pixel contributes to the calculation of the color correction transform.

19. The method of claim 14 wherein step b) further includes calculating a measure of relative pixel brightness for pixels of the digital images and using the measure of relative pixel brightness to vary the degree to which the pixel contributes to the calculation of the color correction transform.

20. The method of claim 1 wherein step b) further includes the steps of calculating a measure of pixel exposure for pixels of the digital images and using the measure of pixel exposure to vary the degree to which the pixel contributes to the calculation of the color correction transform.

21. The method of claim 14 wherein step b) further includes the steps of calculating a measure of pixel exposure for pixels of the digital images and using the measure of pixel exposure to vary the degree to which the pixel contributes to the calculation of the color correction transform.

22. The method of claim 3 wherein the slope coefficients of the least squares best fit line are modified by a constant proportional factor.

23. The method of claim 3 wherein the slope coefficients of the least squares best fit line do not exceed a predetermined value.

24. The method of claim 3 further including the steps of calculating a measure of confidence corresponding to the best fit line and using the measure of confidence to modify the slope coefficients of the least squares best fit line.

25. The method of claim 1 further including scanning to produce the density values of an original photographic film strip that has data recorded uniquely identifying the type of photographic film: reading the data recorded indicating of the type of photographic film material; and selectively excluding the step of applying the color correction transform to the digital images.

26. The method of claim 8 wherein the digital images used to produce the color correction transform are derived from multiple photographic film strips that relate to different consumers.

27. The method of claim 1 wherein the digital images are derived from a digital camera.

28. The method of claim 1 wherein a spatial filter is used to apply the color correction transform.

29. A method of transforming the color appearance of a plurality of digital images, comprising the steps of:
a) receiving a plurality of source digital images from a capture medium wherein each source digital image includes a plurality of pixel values relating to at least three basic colors;
b) calculating a first color transform $T_1[\ ]$ that incorporates a functional relationship dependent upon the pixels of the basic colors, the functional relationship defining an exposure-level-dependent estimate of gray corresponding to the photographic response of the capture medium;
c) calculating a second color transform $T_2[\ ]$ that incorporates a non-linear adjustment that is independent of the pixels of the source digital images and relates to an under-exposure condition and adjusts the color of the under-exposed pixels;
d) calculating a third color transform $T_3[\ ]$ that incorporates a non-linear adjustment that is independent of the pixels of the source digital images and raises the contrast of pixels that relate to an under-exposure condition;
e) combining the color transforms $T_1[\ ]$, $T_2[\ ]$, and $T_3[\ ]$ to calculate a color transform $T_4[\ ]$; and
f) using the color transform $T_4[\ ]$ and the source digital images to produce a set of color corrected digital images.

30. The method of claim 29 wherein step f) further includes the steps of:
i) using the color transform $T_4[\ ]$ and the digital images to calculate intermediate digital images;
ii) calculating a fifth color transform $T_5[\ ]$ that incorporates a functional relationship dependent upon the pixels of the basic colors, the functional relationship defining an exposure-level-dependent estimate of gray; and
iii) using the fifth color transform $T_5[\ ]$ and the intermediate digital images to produce the set of color corrected digital images.

31. Apparatus for transforming the color appearance of a plurality of digital images, comprising:
a) means for receiving a plurality of source digital images from a capture medium wherein each source digital image includes a plurality of pixel values relating to at least three basic colors;
b) means for calculating a first color transform $T_1[\ ]$ that incorporates a functional relationship dependent upon the pixels of the basic colors, the functional relationship defining an exposure-level-dependent estimate of gray corresponding to the photographic response of the capture medium;
c) means for calculating a second color transform $T_2[\ ]$ that incorporates a non-linear adjustment that is independent of the pixels of the source digital images and relates to an under-exposure condition and adjusts the color of the under-exposed pixels;
d) means for calculating a third color transform $T_3[\ ]$ that incorporates a non-linear adjustment that is independent of the pixels of the source digital images and raises the contrast of pixels that relate to an under-exposure condition;
e) means for combining the color transforms $T_1[\ ]$, $T_2[\ ]$, and $T_3[\ ]$ to calculate a color transform $T_4[\ ]$; and
f) means for using the color transform $T_4[\ ]$ and the source digital images to produce a set of color corrected digital images.

32. A computer storage product having at least one computer storage medium having instructions stored therein causing one or more computers to perform the method of claim 1.

* * * * *